(12) United States Patent
Arnold

(10) Patent No.: US 7,043,819 B1
(45) Date of Patent: May 16, 2006

(54) METHODS FOR FORMING METAL PARTS HAVING SUPERIOR SURFACE CHARACTERISTICS

(75) Inventor: James E. Arnold, New Haven, CT (US)

(73) Assignee: Recast Airfoil Group, North Haven, CT (US)

( * ) Notice: Subject to any disclaimer, the term of this patent is extended or adjusted under 35 U.S.C. 154(b) by 0 days.

(21) Appl. No.: 09/505,803

(22) Filed: Feb. 17, 2000

Related U.S. Application Data

(63) Continuation-in-part of application No. 09/143,643, filed on Sep. 3, 1998, now Pat. No. 6,049,978, which is a continuation-in-part of application No. 08/993,116, filed on Dec. 18, 1997, now Pat. No. 5,956,845.

(60) Provisional application No. 60/033,858, filed on Dec. 23, 1996.

(51) Int. Cl.
*B23P 15/00* (2006.01)

(52) U.S. Cl. .................... 29/527.2; 228/193; 427/453; 427/456; 30/350

(58) Field of Classification Search ................ 29/889.1, 29/889.7, 527.2, 402.09, 402.11, 402.13, 29/402.18; 427/453, 456, 376.2, 376.3, 376.4, 427/376.5, 376.6, 376.8; 228/119, 193, 194; 30/138, 165, 350
See application file for complete search history.

(56) References Cited

U.S. PATENT DOCUMENTS

| | | | | |
|---|---|---|---|---|
| 3,680,262 A | * | 8/1972 | Dewitt | |
| 3,889,425 A | * | 6/1975 | Miyamoto | |
| 4,554,130 A | * | 11/1985 | Ecer | 419/8 |
| 4,672,777 A | * | 6/1987 | Dunkin | |
| 4,822,248 A | * | 4/1989 | Wertz et al. | 29/402.07 |
| 5,156,321 A | * | 10/1992 | Liburdi et al. | 29/889.1 |
| 5,211,776 A | * | 5/1993 | Weiman | 427/456 |
| 5,297,746 A | * | 3/1994 | McBride et al. | 241/242 |
| 5,318,217 A | * | 6/1994 | Stinson et al. | 29/889.1 |
| 5,422,140 A | * | 6/1995 | Collin | 427/275 |
| 5,956,845 A | * | 9/1999 | Arnold | 29/889.1 |
| 6,049,978 A | * | 4/2000 | Arnold | 29/889.1 |

FOREIGN PATENT DOCUMENTS

| | | | |
|---|---|---|---|
| EP | 0005285 | * | 11/1979 |
| JP | 59-050177 | * | 3/1984 |

* cited by examiner

*Primary Examiner*—Eric Compton
(74) *Attorney, Agent, or Firm*—John J. Daniels, Esq.

(57) ABSTRACT

A method of forming a metal product. A metal alloy workpiece substrate is provided have pre-process dimensions. The dimensional differences are determined between the pre-process dimensions of the workpiece substrate and desired post-process dimensions of a post-process metal product formed from the workpiece substrate. A build-up thickness is determined of coating material required to obtain the desired post-process dimensions of the post-process metal product. A high-density coating process is performed to coat the workpiece substrate with a coating material to build-up a thickness of coating material effective to obtain desired finished dimensions after performing a sintering heat treatment process and/or a hot isostatic pressing treatment. The sintering heat treatment is performed on the coated workpiece substrate to densify the coating material. Then, the hot isostatic pressing treatment is performed to obtain the post-process metal product having the desired post-process dimensions and having diffusion bonding between the coating material and the workpiece substrate.

19 Claims, 12 Drawing Sheets

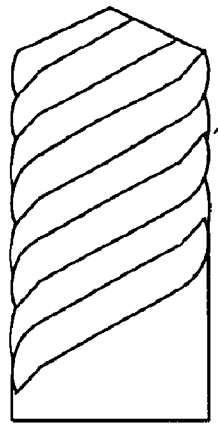
Figure 2(a)
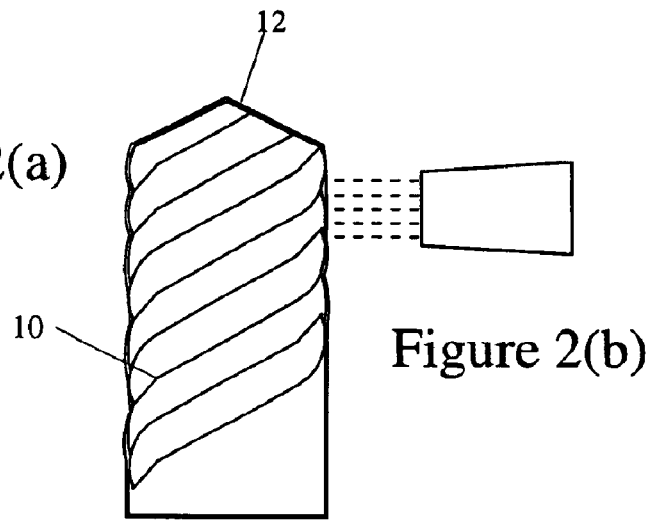
Figure 2(b)
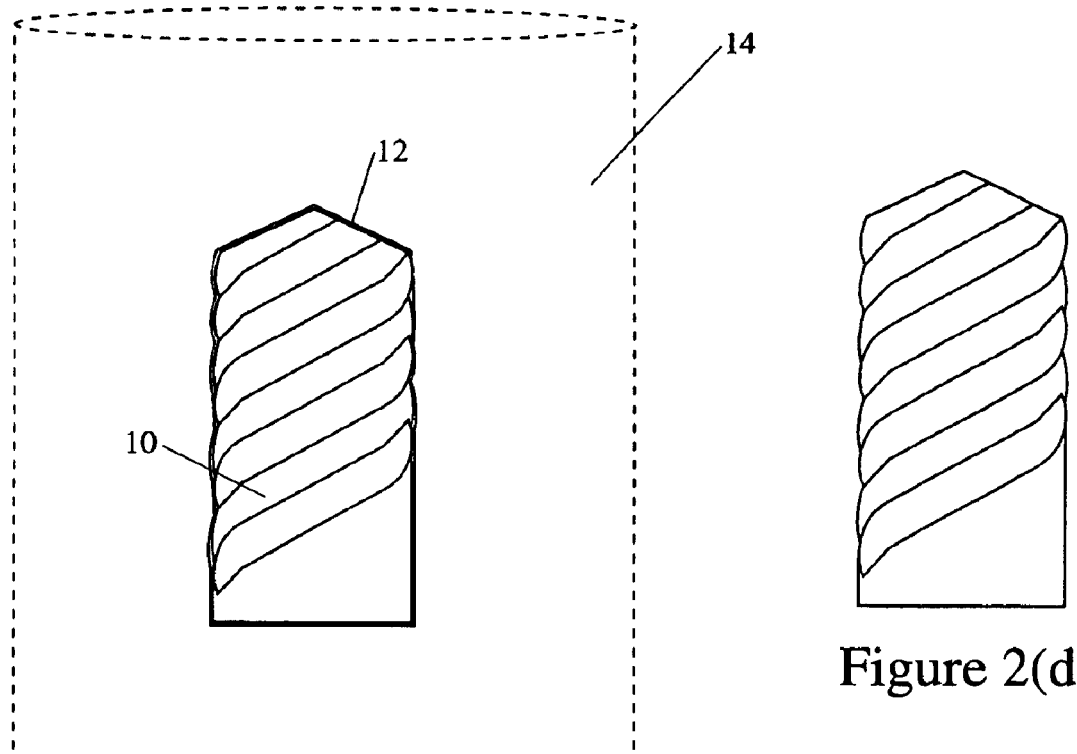
Figure 2(c)
Figure 2(d)

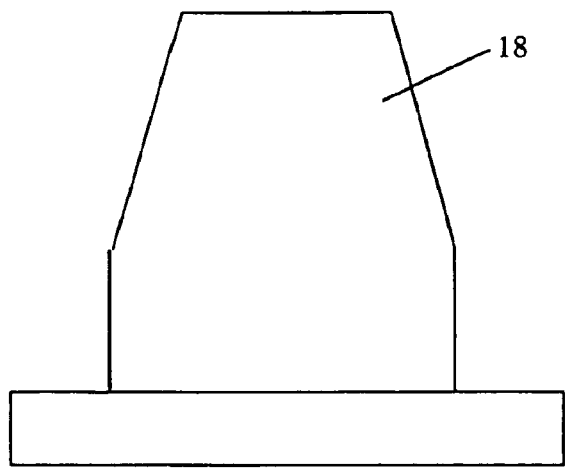
Figure 5(a)
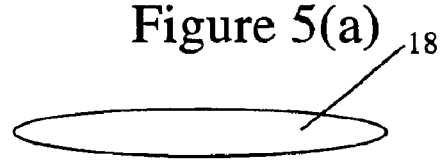
Figure 5(b)
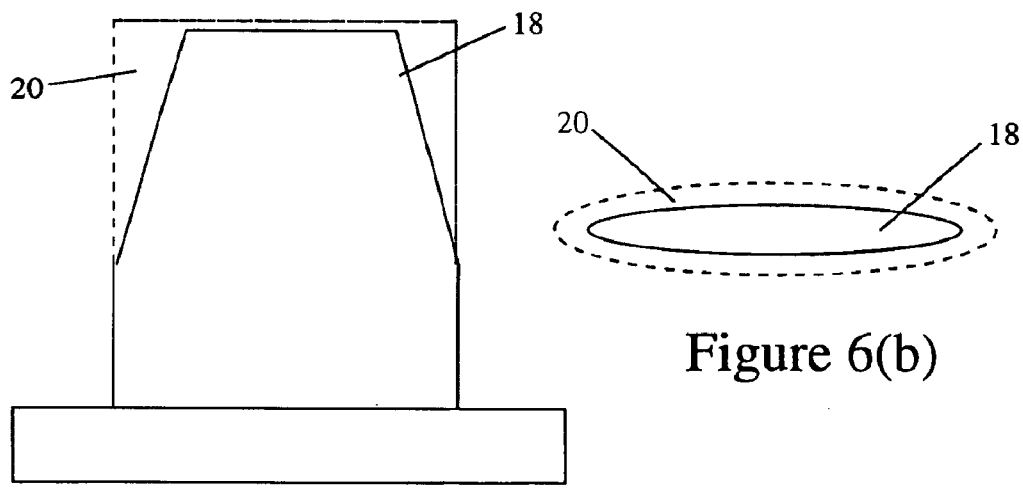
Figure 6(a)
Figure 6(b)

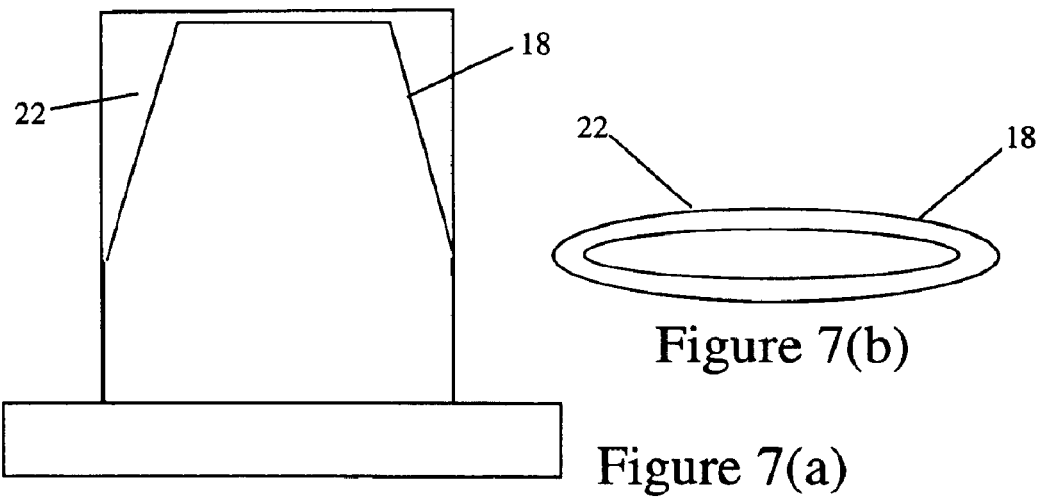
Figure 7(b)
Figure 7(a)
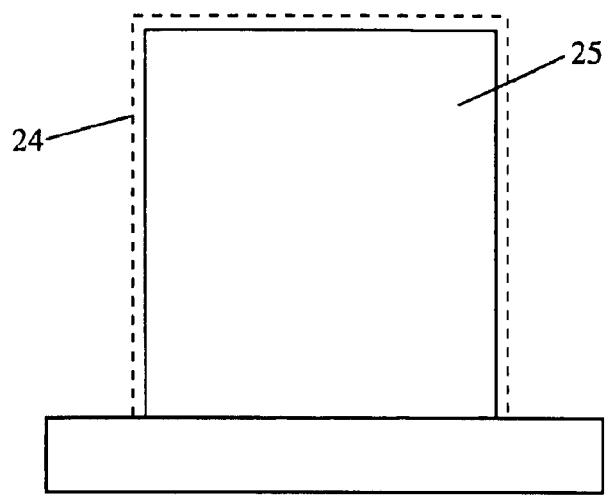
Figure 8(a)
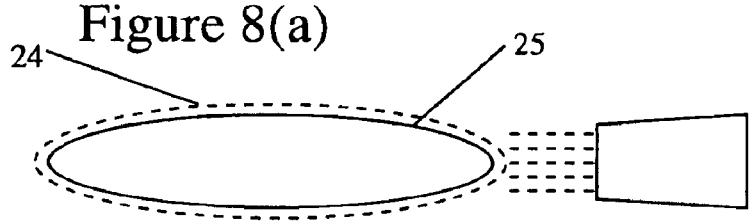
Figure 8(b)

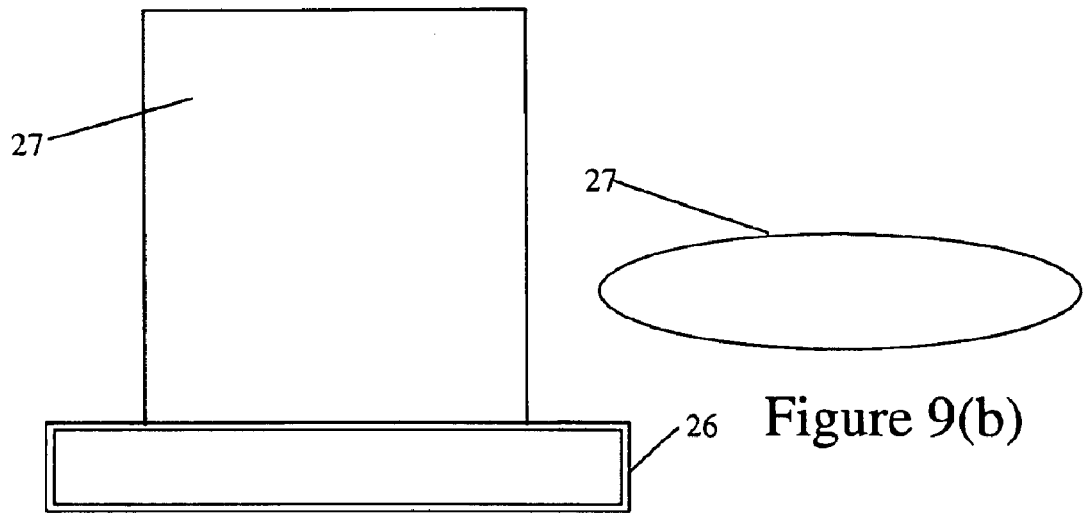
Figure 9(b)
Figure 9(a)
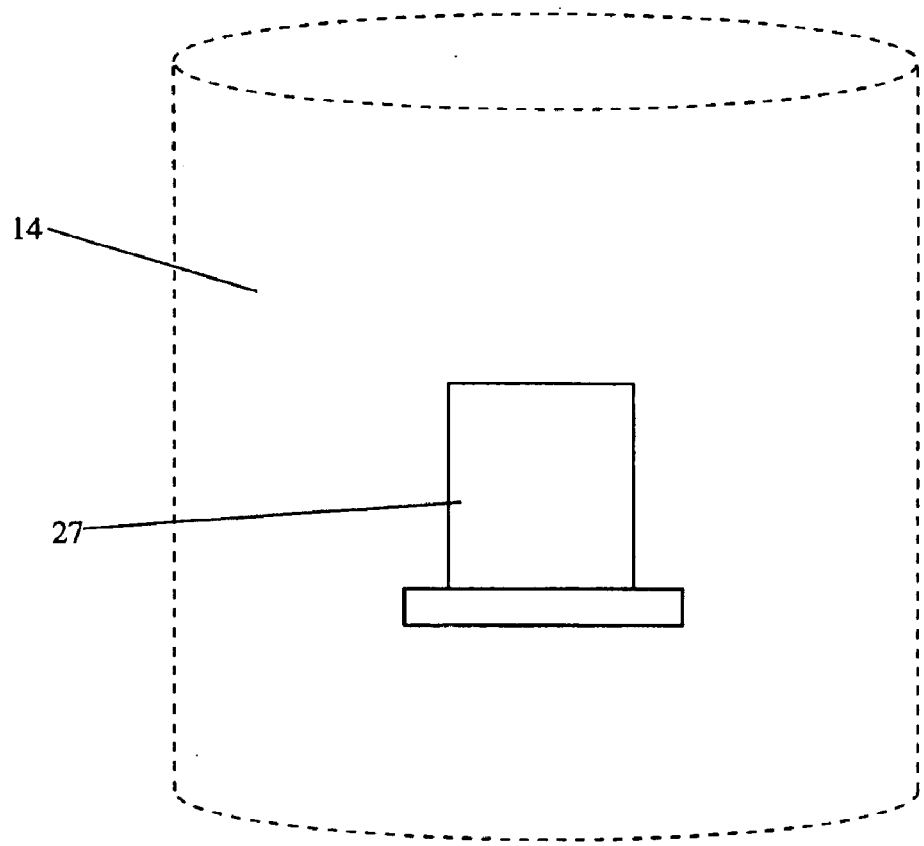
Figure 10

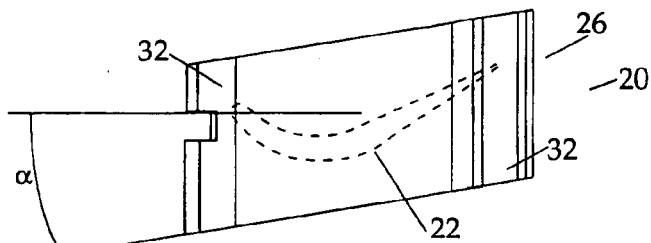
Figure 14(b)
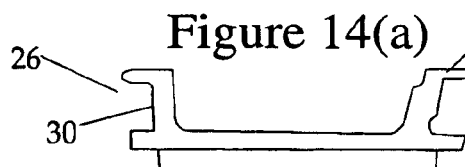
Figure 14(a)
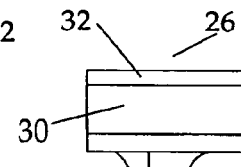 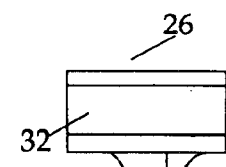
Figure 14(d)   Figure 14(e)
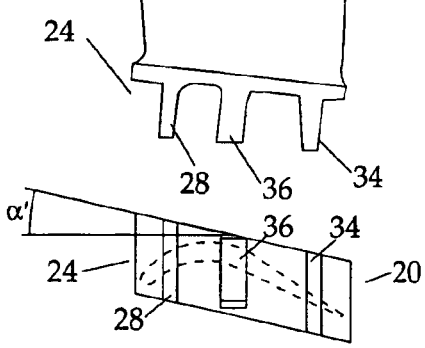
Figure 14(c)

METHODS FOR FORMING METAL PARTS HAVING SUPERIOR SURFACE CHARACTERISTICS

CROSS-REFERENCE TO RELATED APPLICATIONS

The present application is a Continuation-in-Part of application Ser. No. 09/143,643, filed Sep. 3, 1998, now U.S. Pat. No. 6,049,978, which is a Continuation-in-Part of application Ser. No. 08/993,116 filed Dec. 18, 1997, now U.S. Pat. No. 5,956,845, which is the utility patent application of a U.S. provisional application Ser. No. 60/033,858, filed Dec. 23, 1996; and relates to an invention disclosed in an Invention Disclosure Document accepted under the Disclosure Document program on or about Nov. 5, 1996 and assigned Disclosure Document No. 407616.

BACKGROUND OF THE INVENTION

The present invention pertains to a method for forming metal products. More particularly, the present invention pertains to a method for forming metal products having superior surface charateristics.

Airfoil parts, such as blades and vanes, are critical components in the gas turbine engines that are used to powerjet aircraft or for the generation of electricity. Each airfoil part is an individual unit having a root or attachment section and an airfoil section. The airfoil section has specific cordal and length dimensions that define the airfoil characteristics of the part. The root section is engaged with and held by a housing member. A plurality of the airfoil parts are thus assembled with the housing member to form a disc or ring. Blades, which during operation are rotating part, are assembled into and disc. Vane, which remain stationary, are assembled into a nozzle or vane ring. In the operating gas turbine engine the assembled rings and discs, determine the path of the intake, combustion and exhaust gasses that flow through the engine.

The airfoil part may be either a rotating component or a non-rotating component of the gas turbine engine. If the part is a rotating component, during operation of the turbine engine the part is subjected to centrifugal forces that exert deforming stresses. These deforming stresses cause creep rupture and fatigue problems that can result in the failure of the part. Non-rotating components, such as vanes, are not subjected to centrifugal forces that exert deforming stresses. However, like the rotating parts, these parts are subjected to other deformation such as from hot gas erosion and/or foreign particle strikes. This deformation results in the alteration of the dimensions of the airfoil section. The alteration of the dimensions of the airfoil section can detrimentally modify the airflow through the gas turbine engine which is critical to the engine's performance.

An example of a non-rotating airfoil part is the 2nd stage vane of the Pratt & Whitney JT8D model 1 through 17R gas turbine engine. This part is manufactured by the "lost wax" or "investment casting" process. The vane is cast from one of several highly alloyed nickel or cobalt-base materials. As a new part in a new gas turbine engine, or as a new spare part in an overhauled engine, it begins its life cycle with a protective diffusion coating on its airfoil surfaces and a wear coating on surfaces known to have excessive wear patterns.

When the gas turbine engine is operating, the vane will see temperatures of about 1500 degree F. Since the vane does not rotate and thus is not subject to creep rupture, its demise is most often influenced by the number of times it is repaired. The reason for this is the repair process itself.

The repair process consists of the following operations: 1). degrease, wash to remove engine carbon, etc. 2.) grit blast to remove wear coatings, and any sulfidation which is present 3.) chemically remove the diffusion coating 4.) blend to remove nicks, dents, etc. 5.) weld, grind, polish etc.

The repair operations that remove metal by chemical stripping, grit blasting, blending and polishing shorten the life cycle of the vane. The coating removal is a major contributor because it is diffused into the parent metal. When certain minimum airfoil dimensions cannot be met the part is deemed non-repairable and must be retired from service. Thus, there is a need for a method for repairing gas turbine engine airfoil parts that effectively and efficiently restores the airfoil dimensions of the part.

On another front, during the manufacture of metal components a coating operation is performed to provide a coating material layer on the surface of a component substrate. The coating material layer is formed to build-up the metal component to desired finished dimensions and to provide the finished product with various surface attributes. For example, an oxide layer may be formed to provide a smooth, corrosion resistant surface. Also, a wear resistant coating, such as Carbide, Cobalt, or TiN is often formed on cutting tools to provide wear resistance.

Chemical Vapor Deposition is typically used to deposit a thin film wear resistant coating on a cutting tool substrate. For example, to increase the service life of a drill bit, chemical vapor deposition can be used to form a wear resistant coating of Cobalt on a high speed steel (HSS) cutting tool substrate. The bond between the substrate and coating occurs primarily through mechanical adhesion within a narrow bonding interface. During use, the coating at the cutting surface of the cutting tool is subjected to shearing forces resulting in flaking of the coating off the tool substrate. The failure is likely to occur at the narrow bonding interface.

FIG. 12(a) is a side view of a prior art tool bit coated with a wear resistant coating. In this case, the wear resistant coating may be applied by the Chemical Vapor Deposition method so that the entire tool bit substrate receives an even thin film of a relatively hard material, such as Carbide, Cobalt or TiN. Since the coating adheres to the tool bit substrate mostly via a mechanical bond located at a boundary interface, flaking and chipping off the coating off of the substrate is likely to occur during use, limiting the service life of the tool bit. FIG. 12(b) is a side view of a prior art tool bit having a fixed wear resistant cutting tip. In this case, a relatively hard metal cutting tip is fixed to the relatively soft tool bit substrate. The metal cutting tip, which is typically comprised of a Carbide or Cobalt alloy, is fixed to the tool bit substrate by brazing. During extended use the tool bit is likely to fail at the relatively brittle brazed interface between the metal cutting tip and the tool substrate, and again, the useful service life of the tool bit is limited.

Another coating method, known as Conventional Plasma Spray uses a super heated inert gas to generate a plasma. Powder feedstock is introduced and carried to the workpiece by the plasma stream. Conventional plasma spray coating methods deposit the coating material at relatively low velocity, resulting in voids being formed within the coating and in a coating density typically having a porosity of about 5.0%. Again, the bond between the substrate and the coating occurs primarily through mechanical adhesion at a bonding interface, and if the coating is subjected to sufficient shearing forces it will flake off of the workpiece substrate.

Another coating method, known as the Hyper Velocity Oxyfuel (HVOF) plasma thermal spray process is used to produce coatings that are nearly absent of voids. In fact, coatings can be produced nearly 100% dense, with a porosity of less than 0.5%. In HVOF thermal spraying, a fuel gas and oxygen are used to create a combustion flame at 2500 to 3100° C. The combustion takes place at a very high chamber pressure and a supersonic gas stream forces the coating material through a small-diameter barrel at very high particle velocities. The HVOF process results in extremely dense, well-bonded coatings. Typically, HVOF coatings can be formed nearly 100% dense, with a porosity of <0.5%. The high particle velocities obtained using the HVOF process results in relatively better bonding between the coating material and the substrate, as compared with other coating methods such as the Conventional Plasma spray method or the Chemical Vapor Deposition method. However, the HVOF process also forms a bond between the coating material and the substrate that occurs primarily through mechanical adhesion at a bonding interface.

Detonation Gun coating is another method that produces a relatively dense coating. Suspended powder is fed into a long tube along with oxygen and fuel gas. The mixture is ignited in a controlled explosion. High temperature and pressure is thus created to blast particles out of the end of the tube and toward the substrate to be coated.

An example of using HVOF or Detonation Gun coating techniques is disclosed in U.S. Pat. No. 5,584,663, issued to Schell. This reference discloses that the tips of turbine blades can be formed by melting and fusing a powder alloy. Preferably, the blade tip is generated by depositing molten metal alloy powder in multiple passes. Squealers at the perimeter of the blade tip may be formed using methods such as Detonation Gun or HVOF spray methods. The forming step may be used to generate a near- net shaped blade tip, and a subsequent machining step may be employed to generate the final or preferred shape of the blade tip.

Casting is a known method for forming metal components. Typically, a substrate blank is cast to near-finished dimensions. Various machining operations, such as cutting, sanding and polishing are performed on the cast substrate blank to eventually obtain the metal component at desired finished dimensions. A cast metal component will typically have a number of imperfections caused by voids and contaminants in the cast surface structure. The imperfections may be removed by machining away the surface layer of the component, and/or by applying a surface coating.

The manufacture of metal components often entails costly operations to produce products with the desired surface texture, material properties and dimensional tolerances. For example, a known process for manufacturing a metal component requires, among other steps, making a casting of the metal component, treating the metal component using a Hot Isostatic Pressing (HIP) treatment process, and then machining the metal component to remove surface imperfections and obtain the desired dimensional tolerances.

HIP treatment is used in the densification of cast metal components and as a diffusion bonding technique for consolidating powder metals. In the HIP treatment process, a part to be treated is raised to a high temperature and isostatic pressure. Typically, the part is heated to 0.6–0.8 times the melting point of the material comprising the part, and subjected to pressures on the order of 0.2 to 0.5 times the yield strength of the material. Pressurization is achieved by pumping an inert gas, such as Argon, into a pressure vessel. Within the pressure vessel is a high temperature furnace, which heats the gas to the desired temperature. The temperature and pressure are held for a set length of time, and then the gas is cooled and vented.

The HIP treatment process is used to produce near-net shaped components, reducing or eliminating the need for subsequent machining operations. Further, by precise control of the temperature, pressure and time of a HIP treatment schedule a particular microstructure for the treated part can be obtained.

All casting processes must deal with problems that the wrought processes do not encounter. Major among those are porosity and shrinkage that are minimized by elaborate gating techniques and other methods that increase cost and sometimes lower yield. However, the ability to produce a near-net or net shape is the motivating factor. In some cases, it is more cost effective to intentionally cast the part not using elaborate and costly gating techniques and HIP treat the part to eliminate the sub-surface porosity. The surface of the part is then machined until the dense substrate is reached.

U.S. Pat. No. 5,156,321, issued to Liburdi et al and U.S. Pat. No. 5,071,054, issued to Dzugan et al. are examples of methods that employ the HIP treatment process. Liburdi et al. discloses a technique to repair or join sections of a superalloy article. A powder matching the superalloy composition is sintered in its solid state to form a porous structure in an area to be repaired or joined. A layer of matching powder, modified to incorporate melting point depressants, is added to the surface of the sintered region. Liburdi discloses that the joint is raised to a temperature where the modified layer melts while the sintered layer and base metal remain solid. The modified material flows into the sintered layer by capillary action resulting in a dense joint with properties approaching those of the base metal. This reference discloses that HIPing can be used as part of the heat treatment to close any minor interior defects. Dzugan et al. discloses fabricating a superalloy article by casting, and then refurbishing primary defects in the surface of the cast piece. The defects are removed by grinding. The affected portions of the surface are first filled with a material that is the same composition as the cast article. Then, a cladding powder is applied to the surface through the use of a binder coat to obtain a smooth surface. The article is then heated to melt the cladding powder, and then cooled to solidify. Finally, the article is HIPed to achieve final closure of the surface defects.

Metal alloy components, such as gas turbine parts such as blades and vanes, are often damaged during use. During operation, gas turbine parts are subjected to considerable degradation from high pressure and centrifugal force in a hot corrosive atmosphere. The gas turbine parts also sustain considerable damage due to impacts from foreign particles. This degradation results in a limited service life for these parts. Since they are costly to produce, various repair methods are employed to refurbish damaged gas turbine blades and vanes.

Some examples of methods employed to repair gas turbine blades and vanes include U.S. Pat. No. 4,291,448, issued to Cretella et al.; U.S. Pat. No. 4,028,787, issued to Cretella et al.; U.S. Pat. No. 4,866,828, issued to Fraser; and U.S. Pat. No. 4,837,389, issued to Shankar et al.

Cretella '448 discloses a process to restore turbine blade shrouds that have lost their original dimensions due to wear while in service. This reference discloses using the known process of TIG welding worn portions of a part with a weld wire of similar chemistry as the part substrate, followed by finish grinding. The part is then plasma sprayed with a material of similar chemistry to a net shape requiring little or no finishing. The part is then sintered in an argon atmosphere. The plasma spray process used in accordance with Cretella '448 results in a coating porosity of about 5.0%. Even after sintering the coating remains attached to the substrate and weld material only be a mechanical bond at an interface bonding layer making the finished piece prone to chipping and flaking.

Cretella '787 discloses a process for restoring turbine vanes that have lost their original dimensions due to wear while in service. Again, a conventional plasma spray process is used to build up worn areas of the vane before performing a sintering operation in a vacuum or hydrogen furnace. The porosity of the coating, and the interface bonding layer, results in a structure that is prone to chipping and flaking.

Fraser discloses a process to repair steam turbine blades or vanes that utilize some method of connecting them together (i.e. lacing wire). In accordance with the method disclosed by Fraser, the area of a part that has been distressed is removed and a new piece of like metal is welded to the part. The lacing holes of the part are plug welded. The part is then subjected to hot striking to return it to its original contour, and the lacing holes are re-drilled.

Shankar et al. disclose a process for repairing gas turbine blades that are distressed due to engine operation. A low-pressure plasma spray coating is applied to the vanes and the part is re-contoured by grinding. A coating of aluminum is then applied using a diffusion coating process. Again, the conventional low-pressure plasma spray process forms a mechanical bond at an interface boundary between the coating and the substrate, resulting in a structure that is prone to failure due to chipping and flaking.

Other examples of methods for repairing or improving the characteristics of turbine engine airfoil parts include U.S. Pat. No. 5,451,142 issued to Cetel et al.; U.S. Pat. No. 4,921,405, issued to Wilson; U.S. Pat. No. 4,145,481 issued to Gupta et al.; and U.S. Pat. No. 5,732,467 issued to White et al.

Cetel discloses a turbine engine blade having a blade root with a surface having a thin zone of fine grains. A plasma spray technique is used to form a thin layer of material on the root or fir tree portion of the blade. The blade is then HIPed. After the HIP process, the blade is solution heat treated and then machined. This reference is directed to a process for modifying the root section of a turbine blade to improve the mechanical properties of this area of the part. The root section is serrated and is attached to the disc by inserting the root serrations into matching serrations of the disc. The blade is normally produced, as relating to chemistry and microstructure, to maximize the creep rupture and high cycle fatigue properties of the airfoil which is exposed to the hot gas path. The root section of the part thus has those same properties as the airfoil section. However, the root section of the blade is exposed to stress of a type different than the airfoil section, usually referred to as low cycle fatigue. The root section experiences colder operating temperatures than the airfoil section and is not directly in the path of the hot gasses that flow through the engine. Also, the root section is subjected to metal to metal stress during rotation resulting in low cycle fatigue cracking. Cetal is concerned with treating only the fir tree or root portion of the blade to improve its mechanical properties. The root portion or a new or refurbished blade is treated with a plasma spray process, HIPing, and a heat treatment and then machined. The blade is machined to remove material from a high stress portion of the blade root. The material removed by the machining operation is replaced by a zone of fine grains by a plasma spray technique. The part is processed through a HIP cycle to densify the deposit, and then a heat treatment cycle to enhance its properties. Finally, the root is machined back to the desired blueprint dimensions and the part returned to service.

Wilson discloses a turbine engine blade having a single crystal body having an airfoil section and an attachment or root section. A layer of polycrystalline superalloy is applied to the attachment section, preferably by plasma spraying. The coated blade is HIPed and then solution heat-treated to optimize the polycrystalline microstructure.

Grupta discloses a process for producing high temperature corrosion resistant metal articles. A ductile metallic overlay is formed on the surface of an article substrate, and an outer layer is applied over the overlay. The article is then subjected to a HIP treatment to eliminate porosity and create an inter-diffusion between the outer layer the overlay and the substrate.

None of these prior attempts provide for the effective and efficient restoration of the critical airfoil dimensions of a gas turbine engine airfoil part. Typically, an airfoil part will have to be discarded after it has gone through a certain number of repair cycles. The stripping of the protective coating on the part during the repair process is a major contributing factor resulting in the discarding of the part. After a number of repair cycles the part simply does not have the minimum dimensional characteristics necessary for it to perform it intended function. Therefore, there is a need for a method for repairing gas turbine engine airfoil parts that effectively and efficiently restores the critical airfoil dimensions of the part.

Turbine engine airfoil parts, such as vanes, are manufactured to precise tolerances that determine the airflow characteristics for the part. The class of a turbine vane is the angular relationship between the airfoil section and the inner and outer buttresses of the vane. This angular relationship has a direct bearing on the angle of attack of the airfoil section during the operation of the gas turbine engine. Over time, the angular relationship between the airfoil section and the inner and outer buttresses of the vane may become altered due to, for example, deformation of the airfoil section from engine operation and repair processes and the like. Or, the particular angular relationship of the airfoil section and the inner and outer buttresses as originally manufactured may need to be changed to improve engine performance. In any event, there is a need for a method of restoring or reclassifying a gas turbine engine airfoil part.

SUMMARY OF THE INVENTION

The present invention overcome the drawbacks of the conventional art for repairing gas turbine engine airfoil parts. It is an object of the present invention to provide a method forming a metal part having superior surface characteristics. It is another object of the present invention to obtain a diffusion bond between the coating material and the substrate of a formed metal part.

The present invention also overcomes the drawbacks of the conventional art and provides a method of forming, treating and/or repairing metal components so that the resulting metal component has improved metallurgical characteristics. It is an object of the present invention to provide a method of forming a metal product having diffusion bonding occurring between a metal substrate and an applied coating. It is another object of the present invention to provide a method of forming cutting tools having a wear resistant coating diffusion bonded to a cutting surface of a tool substrate. It is still another object of the present invention to provide a method of forming a cast metal product having a diffusion bonded coating formed on a cast metal component.

The present invention also overcomes the drawbacks of the conventional art and provides a method of reclassification of a gas turbine engine airfoil part. It is an object of the present invention to provide a method for reclassification of the airfoil part wherein the strength, integrity and other mechanical characteristics of the part are not compromised by the reclassification procedure.

In accordance with the present invention, a metal alloy workpiece substrate is provided have pre-process dimensions. The dimensional differences are determined between the pre-process dimensions of the workpiece substrate and desired post-process dimensions of a post-process metal product formed from the workpiece substrate. A build-up thickness is determined of coating material required to obtain the desired post-process dimensions of the post-process metal product. A high-density coating process is performed to coat the workpiece substrate with a coating material to build-up a thickness of coating material effective to obtain desired finished dimensions after performing a sintering heat treatment process and/or a hot isostatic pressing treatment. The sintering heat treatment is performed on the coated workpiece substrate to densify the coating material. Then, the hot isostatic pressing treatment is performed to obtain the post-process metal product having the desired post-process dimensions and having diffusion bonding between the coating material and the workpiece substrate.

Also accordance with another aspect of the present invention, the dimensional differences between pre-repaired dimensions of a turbine engine airfoil part and desired post-repair dimensions of the turbine engine airfoil part are determined. A build-up thickness of coating material required to obtain the desired post-repair dimensions of the turbine engine airfoil part is determined. A high-density coating process, such as HVOF, is used to coat the turbine engine airfoil part with a coating material to the determined build-up thickness of coating material effective to obtain the desired post-repair dimensions after performing a sintering heat treatment and a hot isostatic pressing treatment and, if performed, after a re-application of a protective coating. The coating material comprises a metal alloy capable of forming a diffusion bond with the substrate of the turbine engine airfoil part. After the coating material is applied, the sintering heat treatment process is performed to prevent gas entrapment of the coating material and/or the diffusion bonding area during the hot isostatic pressing process. Then, the hot isostatic pressing process is performed to obtain a post-repair turbine engine airfoil part having the desired post-repair dimensions and having diffusion bonding between the coating material and the turbine engine airfoil substrate.

A protective coating may be first removed from the turbine engine airfoil part prior to performing the high-density coating process. Typically, this protective coating is present on an airfoil part to protect it from the hot corrosive environment it experiences during the operation of the gas turbine engine. After performing the hot isostatic pressing process, the protective coating may be re-applied. In this case, the build-up thickness may be determined to take into consideration the additional thickness of the post-repaired part due to the addition of the protective coating and/or a wear coating.

In the typical application of the inventive method, the metal alloy substrate of the turbine engine airfoil part will comprise a nickel or cobalt-base superalloy. The step of performing the high-density coating process may thus include performing a high-density coating process such as a hyper velocity oxy-fuel thermal spray process or a detonation gun process to apply a high-density coating having the same nickel or cobalt-base superalloy composition as the metal alloy substrate.

The sintering heat treatment comprises sintering at a temperature at or about 2150 degrees F. for about 2 hours, which has been found to effectively prevent gas entrapment of the applied high-density coating during the hot isostatic pressing process. In the case of a nickel or cobalt-base superalloy substrate, the hot isostatic pressing treatment can be performed at a temperature of about 2200 F in about 15 KSI argon for about 4 hours. The parameters of the hot isostatic pressing treatment typically call for heating the engine part to a temperature that is substantially 80% of the melting point of the metal alloy; and pressurizing the engine part to a pressure substantially between 20 and 50 percent of the yield strength of the metal alloy in an inert gas atmosphere.

The dimensional differences between the pre-repaired dimensions of the turbine engine airfoil part and the desired post-repair dimensions of the turbine engine airfoil part are measured from at least one of the cordal and length dimensions of the airfoil part. By performing the inventive method for repairing a gas turbine engine airfoil part, the post-repair dimensions are equal to the dimensions necessary for effectively returning the part to active service. The diffusion bonding between the coating material and the substrate ensures that the repaired airfoil part is robust enough to withstand the highly demanding environmental conditions present in an operating gas turbine engine.

In accordance with another embodiment of the inventive method, a turbine engine part, which is comprised of a metal or metal alloy, is first cleaned. If necessary, eroded portions of the turbine engine part are welded using a weld material comprised of the same metal or metal alloy as the parent or original metal engine part. The welding operation is performed to build up heavily damaged or eroded portions of the turbine engine part. If the part is not heavily damaged, the welding operation may be obviated. The welding operation will typically produce weld witness lines. The weld witness lines are ground flush to prevent blast material from becoming entrapped in the weld witness lines. Portions of the engine part that are not to be HVOF sprayed are masked, and the engine part is again cleaned in preparation for HVOF spraying. HVOF plasma spraying of the unmasked portions of the engine part is performed. The HVOF plasma spray material (coating material) is comprised of the same metal alloy as the parent or original metal engine part. The HVOF plasma spray material is applied so as to build up a cordal dimension of the engine part to a thickness greater than the thickness of an original cordal dimension of the engine part. After the HVOF spray material is applied, a sintering heat treatment process is performed to prevent gas entrapment of the coating material and/or the diffusion bonding area during the hot isostatic pressing process. A hot isostatic pressing (HIP) treatment is performed on the coated engine part to densify the coating material, to create a diffusion bond between the coating material and the parent and the weld material, and to eliminate voids between the turbine engine part, the weld material and the coated material. Finally, the engine part is machined, ground and/or polished to the original or desired dimensions.

The present invention offers a substantial improvement over the prior attempts at repairing turbine engine airfoil parts. By the inventive method, the resulting repaired part is returned to the dimensions required to place the part back into useful service. Further, in accordance with the present invention, a diffusion bond is obtained between the coating material and the substrate of the turbine engine airfoil part. This diffusion bond is extremely robust and results in a repaired engine part that has the appropriate mechanical properties that allow the part to be safely returned to service. Thus, the inventive method of repairing a turbine engine airfoil part offers substantial savings because it provides for the efficient and effective repairing of expensive engine parts which otherwise might have been discarded.

In accordance with another aspect of the present invention, a method of forming a metal product having diffusion bonding occurring between a metal substrate and an applied coating is provided. The first step of the inventive method is to determine the attributes of a final workpiece product. For example, if the final workpiece product is a cutting tool the attributes include a wear resistant surface formed on a relatively inexpensive tool substrate. An appropriate substrate composition is then determined depending on the selected attributes. In the example of a cutting tool, the substrate composition may be high speed steel, which is relatively inexpensive to form but durable enough for its intended purpose. A workpiece substrate is formed to near-finished dimensions, using known processes such as casting, extruding, molding, machining, etc. An appropriate coating material composition is determined depending on the selected attributes. Again, in the example of a cutting tool, the coating material could be selected from a number of relatively hard and durable metals and alloys such as Cobalt, Carbide, TiN, etc. The selection of both the substrate and coating composition also depends on their metallurgical compatibility with each other.

The workpiece substrate is prepared for a high-density coating process. The preparation may include cleaning, blasting, machining, masking or other like operations. Once the workpiece substrate has been prepared, a high-density coating process is performed to coat the workpiece substrate. The coating material is built-up to a thickness that is effective to obtain desired finished dimensions after performing a hot isostatic pressing treatment (described below). The high-density coating process may comprise performing a hyper velocity oxy-fuel thermal spray process. In the case of HVOF, a fuel gas and oxygen are used to create a combustion flame at 2500 to 3100° C. The combustion takes place at a very high chamber pressure and a supersonic gas stream forces the coating material through a small-diameter barrel at very high particle velocities. The HVOF process results in extremely dense, well-bonded coatings. Typically, HVOF coatings can be formed nearly 100% dense, with at a porosity of about 0.5%. The high particle velocities obtained using the HVOF process results in relatively better bonding between the coating material and the substrate, as compared with other coating methods such as the conventional plasma spray method or the chemical vapor deposition method. However, the HVOF process forms a bond between the coating material and the substrate that occurs primarily through mechanical adhesion at a bonding interface. As will be described below, in accordance with the present invention this mechanical bond is converted to a metallurgical bond by creating a diffusion bond between the coating material and the workpiece substrate. This diffusion bond does not have the interface boundary which is usually the site of failure.

The diffusion bond is created by subjecting the coated workpiece substrate (or, in the case of the inventive repair method, the coated airfoil part) to a hot isostatic pressing (HIP) treatment. The appropriate hot isostatic pressing treatment parameters are selected depending on the coating, the workpiece substrate and the final attributes that are desired. The hot isostatic pressing treatment is performed on the coated workpiece substrate to obtain a metal product having the desired finished dimensions and diffusion bonding between the coating material and the workpiece substrate.

HIP treatment is conventionally used in the densification of cast metal components and as a diffusion bonding technique for consolidating powder metals. In the HIP treatment process, a part to be treated is raised to a high temperature and isostatic pressure. Typically, the part is heated to 0.6–0.8 times the melting point of the material comprising the part, and subjected to pressures on the order of 0.2 to 0.5 times the yield strength of the material. Pressurization is achieved by pumping an inert gas, such as Argon, into a pressure vessel. Within the pressure vessel is a high temperature furnace, which heats the gas to the desired temperature. The temperature and pressure is held for a set length of time, and then the gas is cooled and vented.

In accordance with the present invention, the HIP treatment process is performed on a HVOF coated substrate to convert the adhesion bond, which is merely a mechanical bond, to a diffusion bond, which is a metallurgical bond. In accordance with the present invention, an HVOF coating process is used to apply the coating material having sufficient density to effectively undergo the densification changes that occur during the HIP process. After the HVOF spray material is applied, a sintering heat treatment process can be performed to further densify the coating to prevent gas entrapment of the coating material and/or the diffusion bonding area during the hot isostatic pressing process. If the coating material and the workpiece substrate are comprised of the same metal composition, then the diffusion bonding results in a particularly seamless transition between the substrate and the coating.

The inventive method can be used for forming a metal product having a wear resistant surface. This method can be employed to produce, for example, a long lasting cutting tool from a relatively inexpensive cutting tool substrate. In accordance with this aspect of the invention, a workpiece substrate is formed to near-finished dimensions. A high-density coating process, such as a hyper velocity oxy-fuel thermal spray process, is performed to coat the workpiece substrate with a wear resistant coating material. The coating material is built-up to a thickness that is effective to obtain desired finished dimensions after performing a hot isostatic pressing treatment. A sintering heat treatment step may be performed improve the density of the coating material and prevent gas entrapment during the hot isostatic pressing treatment. The hot isostatic pressing treatment is performed on the coated workpiece substrate to obtain a metal product having the desired finished dimensions and diffusion bonding between the coating material and the workpiece substrate.

The inventive method can also be used for forming a cast metal product. This method can be employed to produce, for example, a cast part having a hard and/or smooth surface. In accordance with the present invention, a part is cast to dimensions to less than the finished dimensions, or a cast part is machined to less than the finished dimensions. The cast part is then coated using the HVOF coating method as described herein. The HVOF coating is applied to a thickness sufficient to bring the part to its finished dimensions. The HVOF coated, cast part is then HIP treated as described herein to obtain a finished part having desired dimensions and surface characteristics.

In accordance with this aspect of the invention, a cast metal workpiece is provided. The cast metal workpiece may be formed from any conventional casting method such as: investment, sand and resin shell casting.

The cast metal workpiece is machined, if necessary, to near-finished dimensions. A high-density coating process, such as a hyper velocity oxy-fuel thermal spray process (HVOF), is performed to coat the workpiece substrate with a coating material. The coating material is built-up to a thickness effective to obtain desired finished dimensions after performing a hot isostatic pressing treatment. A sintering heat treatment step may be performed improve the density of the coating material and prevent gas entrapment during the hot isostatic pressing treatment. The hot isostatic pressing treatment is performed on the coated workpiece substrate to obtain a metal product having the desired finished dimensions and diffusion bonding between the coating material and the workpiece substrate.

In accordance with another aspect of the present invention, the reclassification of a gas turbine engine airfoil part is obtained. The dimensional differences between pre-reclassified dimensions of the buttresses of a turbine engine airfoil part and desired post-reclassified dimensions of the buttresses are determined. That is, the change in shape of the inner buttress and outer buttress necessary to obtained a desired angular relationship between the airfoil section and the buttresses is determined. Build-up thickness of coating material required to obtain the desired post-reclassified dimensions of the buttresses is determined. A high-density coating process, such as HVOF, is used to coat the buttresses of the turbine engine airfoil part with a coating material. The portions of the part that are not to be built up, such as the airfoil section and parts of the buttresses, may be masked before applying the high-density coating. Also, some of the coated surfaces of the part may need to be built up more than others. The coating material is applied to the determined build-up thickness of coating material effective to obtain the desired post-reclassification dimensions after performing a hot isostatic pressing treatment, and after the selective removal of some of the original buttress material and some of the built up coating material. A sintering heat treatment may be performed before the hot isostatic pressing treatment.

As discussed herein, the coating material comprises a metal alloy capable of forming a diffusion bond with the substrate of the turbine engine airfoil part. After the coating material is applied, the sintering heat treatment process may be performed to prevent gas entrapment of the coating material and/or the diffusion bonding area during the hot isostatic pressing process. Then, the hot isostatic pressing (HIP) process is performed so that the buttresses of the turbine engine airfoil part have a robust diffusion bonding between the coating material and the original material of the buttresses. Having built up the appropriate dimensions of the inner buttress and outer buttress, the reclassification of the part is obtained by selectively removing the original buttress material and, if necessary, some of the built up material until the angular relationship between the airfoil section and the inner and outer buttresses is obtained. The material can be removed through milling, grinding, or other suitable and well known machining operations. Further, to facilitate obtaining the correct dimensions the centerline position of the airfoil part can be located and held by mounting the part in a suitable holding fixture when machining the buttresses.

The fixture may be so constructed so that a vane that has at least a minimum amount of material built up on its buttresses can be machined and reclassified. In this case, it may not be necessary to determine the dimensional differences or the required build-up thickness. Rather, the inventive high density coating and HIPing process (and, if needed sintering) can be performed to build up at least the minimum amount of material diffusion bonded to the buttresses. Then, the vane is placed in the fixture and the excess material (both original buttress material and the built-up material) is machined until the buttresses have been reshaped and the vane reclassified as intended.

Figure 3A:
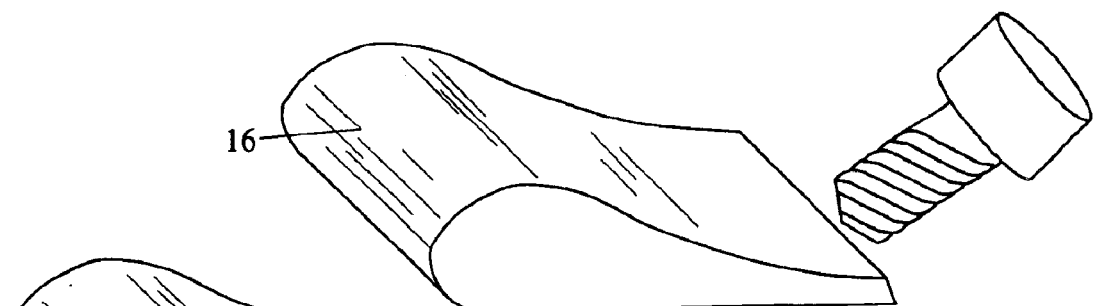
Figure 3B:
Figure 3C:
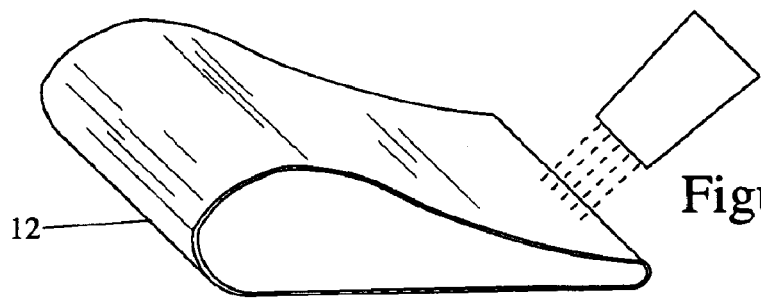
Figure 3D:
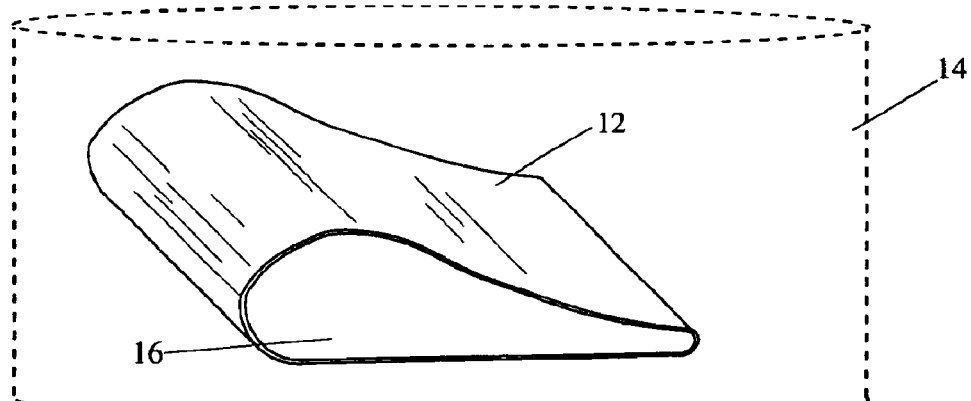
Figure 3E:
Figure 4:
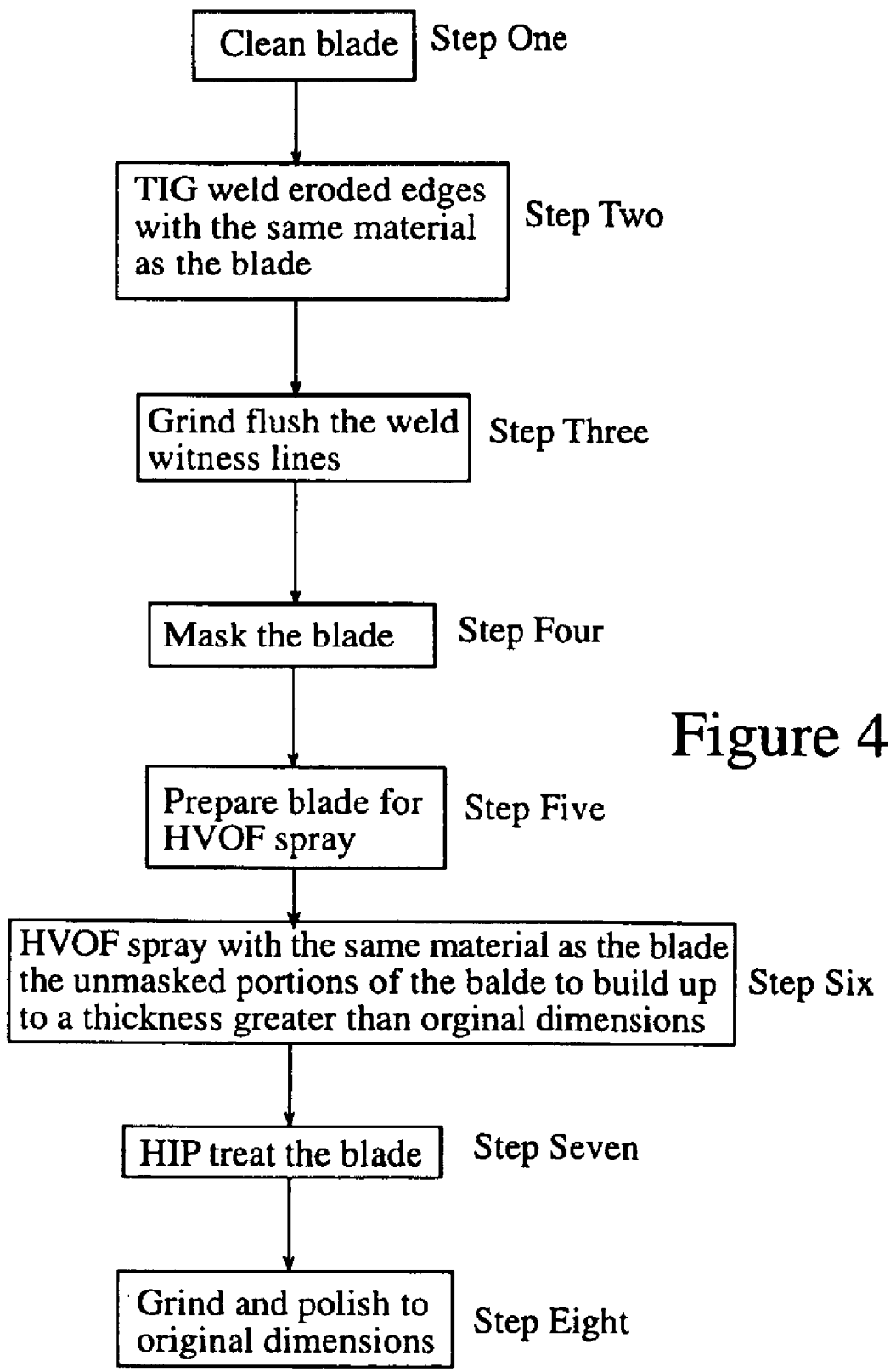
Figure 11A:
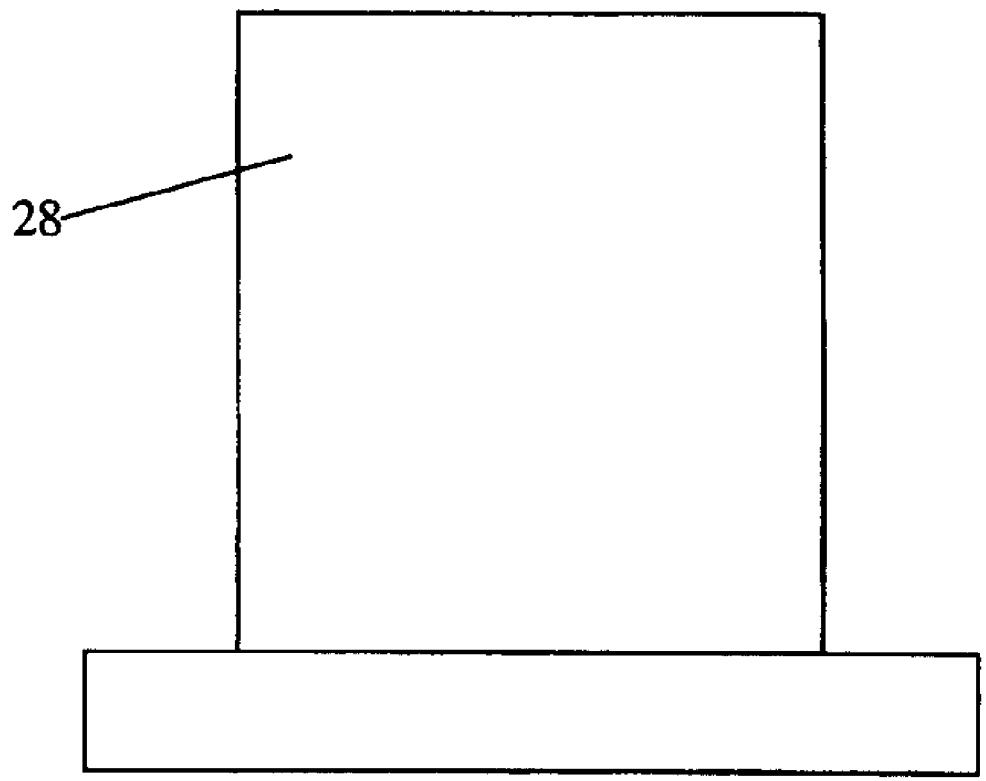
Figure 11B:
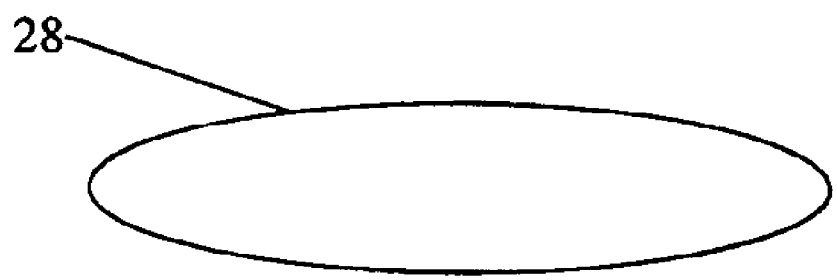
Figure 12A:
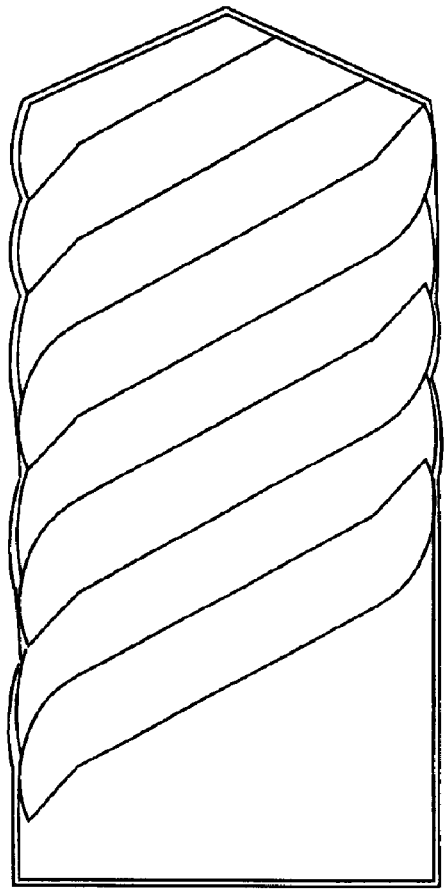
Figure 12B:
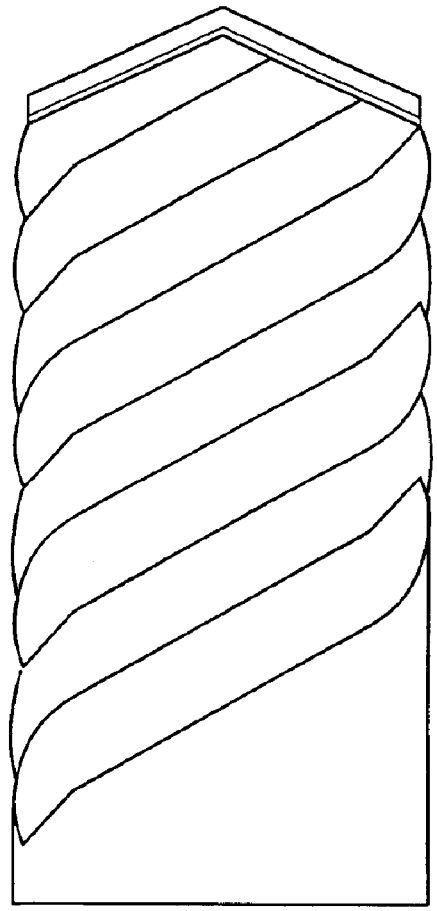
Figure 13:
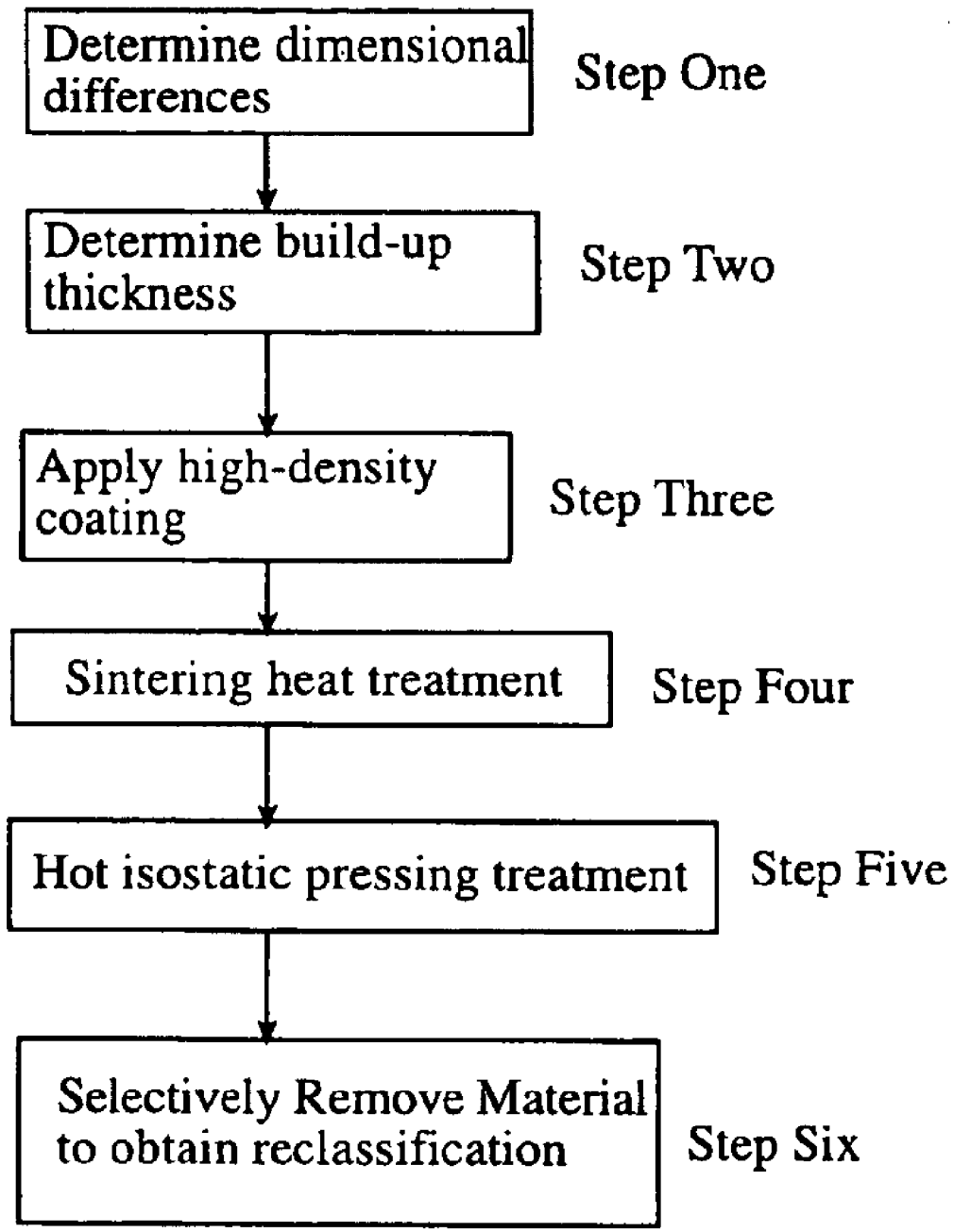

FIG. (b) is a flow chart showing the steps of the inventive method of forming metal products and metal components having a wear resistant coating;

FIG. 2(a) is a schematic view of a tool substrate provided in accordance with the inventive method of forming metal components having a wear resistant coating;

FIG. 2(b) is a schematic view of the tool substrate having a wear resistant coating applied using an HVOF thermal spray process in accordance with the inventive method of treating metal components having a wear resistant coating;

FIG. 2(c) is a schematic view of the HVOF spray coated tool substrate undergoing a HIP treatment process in a HIP vessel in accordance with the inventive method of forming metal components having a wear resistant coating;

FIG. 2(d) is a schematic view of the final HVOF spray coated and HIP treated tool having a wear resistant coating layer diffusion bonded to the tool substrate in accordance with the inventive method of forming metal components having a wear resistant coating;

FIG. 3(a) is a schematic perspective view of a cast metal component undergoing a machining operation in accordance with the inventive method of forming a metal product;

FIG. 3(b) is a schematic perspective view of the machined cast metal component in accordance with the inventive method of forming a metal product;

FIG. 3(c) is a schematic perspective view of the machined cast metal component having a coating applied using an HVOF thermal spray process in accordance with the inventive method of forming a metal product;

FIG. 3(d) is a schematic perspective view of the HVOF spray coated machined cast metal component undergoing a HIP treatment process in a HIP vessel in accordance with the inventive method of forming a metal product;

FIG. 3(e) is a schematic perspective view of the final HVOF spray coated and HIP treated machined cast metal product having a coating layer diffusion bonded to the machined cast metal component in accordance with the inventive method of forming a metal product;

FIG. 4 is a flow chart showing the steps of the inventive method of repairing a turbine engine part;

FIG. 5(a) is a schematic side view of a worn turbine engine part before undergoing the inventive method of repairing a turbine engine part;

FIG. 5(b) is a schematic cross-sectional view of the worn turbine engine part before undergoing the inventive method of repairing a turbine engine part;

FIG. 6(a) is a schematic side view of the worn turbine engine part showing the worn areas to be repaired using the inventive method of repairing a turbine engine part;

FIG. 6(b) is a schematic cross-sectional view of the worn turbine engine part showing the worn areas to be repaired using the inventive method of repairing a turbine engine part;

FIG. 7(a) is a schematic side view of the worn turbine engine part showing the worn areas filled in with similar weld material in accordance with the inventive method of repairing a turbine engine part;

FIG. 7(b) is a schematic cross-sectional view of the worn turbine engine part showing the worn areas filled in with similar weld material in accordance with the inventive method of repairing a turbine engine part;

FIG. 8(a) is a schematic side view of the welded turbine engine part showing areas to be built up with similar coating material using an HVOF spray coating process in accordance with the inventive method of repairing a turbine engine part;

FIG. 8(b) is a schematic cross-sectional view of the welded turbine engine part showing areas to be built up with similar coating material using an HVOF spray coating process in accordance with the inventive method of repairing a turbine engine part;

FIG. 9(a) is a schematic side view of the HVOF built up, welded turbine engine part showing an area masked before performing the HVOF spray coating process in accordance with the inventive method of repairing a turbine engine part;

FIG. 9(b) is a schematic cross-sectional view of the HVOF built up, welded turbine engine part in accordance with the inventive method of repairing a turbine engine part;

FIG. 10 is a schematic view of the HVOF built up, welded turbine engine part undergoing a HIP treatment process in a HIP vessel in accordance with the inventive method of repairing a turbine engine part;

FIG. 11(a) is a schematic side view of the final HVOF spray coated and HIP repaired turbine engine part having a similar metal coating layer diffusion bonded to the original parent substrate and welded portions in accordance with the inventive method of repairing a turbine engine part;

FIG. 11(b) is a schematic cross-sectional view of the final HVOF spray coated and HIP repaired turbine engine part having a similar metal coating layer diffusion bonded to the original parent substrate and welded portions in accordance with the inventive method of repairing a turbine engine part;

FIG. 12(a) is a side view of a prior art tool bit coated with a wear resistant coating;

FIG. 12(b) is a side view of a prior art tool bit having a fixed wear resistant cutting tip;

FIG. 13 is a flow chart showing the steps of the inventive method for reclassifying a gas turbine engine airfoil part;

FIG. 14(a) is a front view of a vane from a gas turbine engine showing the airfoil section, the outer buttress and the inner buttress;

FIG. 14(b) is a partial top view of the vane shown in FIG. 14(a) showing the outer buttress and angle α indicating the angular relationship between the airfoil and the outer buttress;

FIG. 14(c) is a partial bottom view of the vane shown in FIG. 14(a) showing the inner buttress and angle α' indicating the angular relationship between the airfoil and the inner buttress;

FIG. 14(d) is a partial left-side view of the vane shown in FIG. 14(a) showing the leading edge foot of the inner buttress and the outer foot front face of a buttress rail of the outer buttress; and FIG. 14(e) is a partial right-side view of the vane shown in FIG. 14(a) showing the trailing edge foot of the inner diameter buttress and the other buttress rail of the outer diameter buttress.

DETAILED DESCRIPTION OF THE INVENTION

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1A:
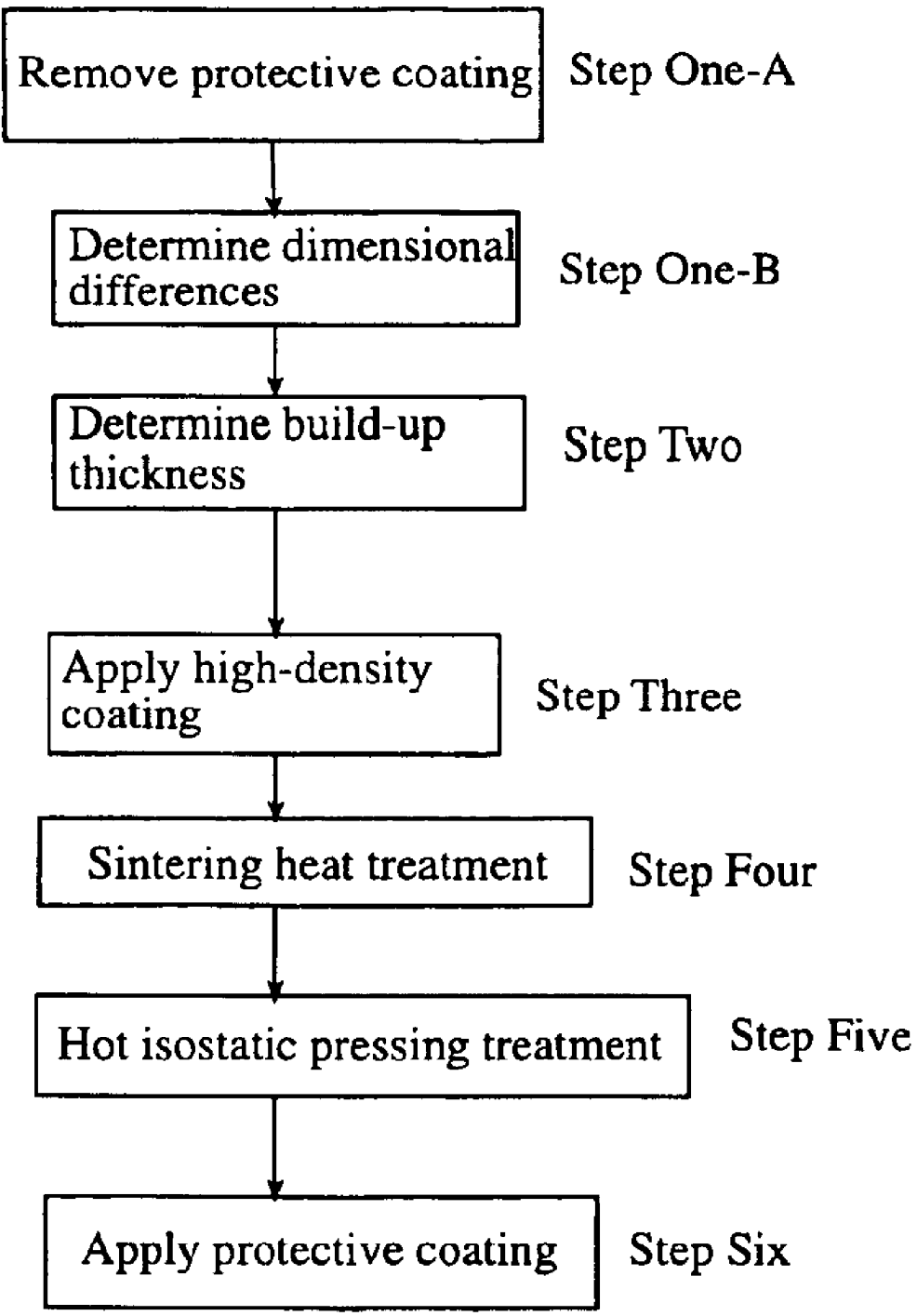
FIG. 1(a) is a flow chart showing the steps of the inventive method for repairing a gas turbine engine airfoil part.

Referring to FIG. 1(a), in accordance with the present invention, the dimensional differences between pre-repaired dimensions of a turbine engine airfoil part and desired post-repair dimensions of the turbine engine airfoil part are determined (Step One-B). The turbine engine airfoil part has a substrate comprised of a superalloy. A build-up thickness of coating material required to obtain the desired post-repair dimensions of the turbine engine airfoil part is determined (Step Two). A high-density coating process, such as HVOF, is used to coat the turbine engine airfoil part with a coating material to the determined build-up thickness of coating material effective to obtain the desired post-repair dimensions after performing a sintering heat treatment and a hot isostatic pressing treatment (Step Three). The coating material comprises a metal alloy capable of forming a diffusion bond with the substrate of the turbine engine airfoil part. After the coating material is applied, a sintering heat treatment process is performed to prevent gas entrapment of the coating material and/or the diffusion bonding area during the hot isostatic pressing process (Step Four). Then, the hot isostatic pressing process is performed to obtain a post-repair turbine engine airfoil part having the desired post-repair dimensions and having diffusion bonding between the coating material and the turbine engine airfoil substrate (Step Five).

In accordance with the present invention, a protective coating must be first removed from the turbine engine airfoil part prior to performing the high-density coating process (Step One-A). After performing the hot isostatic pressing process, a protective coating may be re-applied (Step Six). In this case, the build-up thickness may determined in Step Two to take into consideration the additional thickness of the post-repaired part due to the addition of the protective coating.

Typically, this protective coating is present on an airfoil part to protect it from the hot corrosive environment it experiences during service. This protective coating must be removed during the inspection and/or repair process. After undergoing a number of inspection and/or repair cycles, the airfoil part was conventionally discarded simply because the airfoil dimensions of the part were too deformed for the part to be usable. However, in accordance with the present inventive repair method, the airfoil dimensions are restored and a robust repaired airfoil part is obtained.

In the typical application of the inventive method, the metal alloy substrate of the turbine engine airfoil part will comprise a nickel or cobalt-base superalloy. The step of performing the high-density coating process (Step Three) may thus include performing a high-density coating process such as a hyper velocity oxy-fuel thermal spray process or a detonation gun process to apply a high-density coating having the same nickel or cobalt-base superalloy composition as the metal alloy substrate.

In an embodiment of the invention in which the coating material and the substrate alloy comprise INCO713C nickel or cobalt-base superalloy, the sintering heat treatment (Step Four) comprises sintering at a temperature at or about 2150 degrees F. for about 2 hours, which has been found to effectively prevent gas entrapment of the applied high-density coating during the hot isostatic pressing process. In the case of the nickel or cobalt-base superalloy substrate, an effective hot isostatic pressing treatment (Step Five) can be performed at a temperature of about 2200 F in about 15 KSI argon for about 4 hours. The parameters of the hot isostatic pressing treatment typically call for heating the engine part to a temperature that is substantially 80% of the melting point of the metal alloy; and pressurizing the engine part to a pressure substantially between 20 and 50 percent of the yield strength of the metal alloy in an inert gas atmosphere.

The dimensional differences between the pre-repaired dimensions of the turbine engine airfoil part and the desired post-repair dimensions of the turbine engine airfoil part are measured from at least one of the cordal and length dimensions of the airfoil part (Step One-B). By performing the inventive method for repairing a gas turbine engine airfoil part, the post-repair dimensions are equal to the dimensions necessary for effectively returning the part to active service. The obtained diffusion bonding between the coating material and the substrate ensures that the repaired airfoil part is robust enough to withstand the highly demanding environmental conditions present in an operating gas turbine engine. Thus, the present invention offers substantial cost savings over having to replace a turbine gas engine airfoil part which otherwise might have been discarded.

The present invention can be used as a process for restoring critical gas path area dimensions in cast nickel or cobalt-base superalloy vane components. These dimensions may become altered due to erosion or particle strikes during the service life of the part, and/or may become altered during an inspection or repair process wherein a protective coating is stripped from the part.

The inventive process, referred to herein as "recast", briefly consists of applying a pre-alloyed metal powder, compositionally identical to the superalloy used in the original manufacture of the vane being repaired, directly on dimensionally discrepant surfaces, densifying the metal powder coating, and causing it to bond to the affected surface.

More specifically, in the preferred embodiment of the invention candidate recast surfaces are abrasively clean, thermal sprayed using high velocity oxy fuel processes (HVOF), sintered, and hot isostatically pressed (HIPed).

Thermal spray metal powders, produced by a vacuum/inert gas atomization processes, are applied directly to the dimensionally discrepant surfaces of a turbine engine airfoil part using robotic HVOF processes carefully controlled to produce dense coatings while minimizing thermal gradients and oxidative solute losses.

Properly applied HVOF coatings are dense but sometimes contain interconnected micropores. In accordance with the present invention, such "porous" HVOF coatings are more fully densified by sintering and subsequently diffusion-bonded to substrate surfaces by HIPing at temperatures and pressures commensurate with the nickel or cobalt-base alloy under consideration.

Recast surfaces are compositionally identical to, but microstructurally different from, original or "as-cast" substrates. As-cast substrates are defined herein as a substrate formed by a conventional casting process, such as the lost wax or investment casting process described above. The microstructures of cast nickel or cobalt-base superalloy substrate materials such as used in the manufacture of gas turbine vanes generally consist of relatively large amount of an intermetallic precipitate referred to as "gamma prime" within, and networks of carbides and borides within and around, large "gamma" matrix grains. The amount and morphology of gamma prime, carbides, and borides are determined by composition, processing history, and heat treatment.

Recast microstructures similarly consist of gamma prime, carbides, and borides precipitated in and around gamma matrix grains; but, recast matrix grains are considerably smaller than as-cast grains. Recast gamma prime, carbide and boride precipitates are similarly finer than as-cast. In addition, some of the more reactive solutes (e.g., aluminum) in the thermal spray powders oxidize during the HVOF spray process to form oxide particles which become randomly dispersed in the recast deposit.

Articles repaired by recast are best described as bimetallic composites comprised of recast coatings bonded to as-cast substrates. The mechanical properties of such repaired articles vary depending on the relative volume fraction of the recast coating, the specific alloy(s) under consideration, and processing history.

Example of Recast INCO713C/cast INCO713C Composite Mechanical Properties Obtained in Accordance with the Present Invention:

Representative tensile and stress-rupture properties of recast INCO713C/cast INCO713C composite test specimens were measured to more fully elucidate the recast process.

INCO713C was selected as the base nickel or cobalt-base superalloy for measurement because it is specified by a large number of engine manufactures for gas turbine component applications, and is bill-of-material for JT8D second-stage vanes, a candidate component for the inventive recast repair method.

Near cast-to-size INCO713C test bars were machined into ASTM proportioned mechanical test specimens with tapered (approximately three percent) gauge lengths. The average minimum gauge length diameter was 0.2137 inches.

The machined test specimens were grit-blasted with silicon carbide, ultrasonically cleaned, and robotically sprayed with INCO713C powder using Diamond Jet HVOF processes. The composition of the INCO713C powder used in these evaluations is shown in Table I.

TABLE I

Certified Compositions of INCO713C Atomized Powder and Cast-To-Size Test Bars

| Element | EMS 55079 | Atomized Powder | Cast-To-Size Test Bars (Heat # 8616) |
|---|---|---|---|
| Nickel | Balance | Balance | Balance |
| Chromium | 11.0 to 13.0 | 13.6 | 13.67 |
| Aluminum | 5.5 to 6.5 | 5.86 | 5.61 |
| Molybdenum | 3.8 to 5.2 | 4.39 | 4.06 |
| Columbium | 1.5 to 2.5 | 2.1 | 2.08 |
| Titanium | 0.4 to 1.0 | 0.9 | 0.84 |
| Zirconium | 0.05 to 0.15 | 0.07 | 0.05 |
| Carbon | 0.05 to 0.07 | 0.1 | 0.13 |
| Boron | 0.005 to 0.015 | 0.01 | 0.008 |
| Cobalt | 1.00 max. | <0.01 | <0.05 |
| Silicon | 0.50 max. | 0.09 | <0.05 |
| Copper | 0.05 max. | 0.04 | <0.05 |

TABLE I-continued

Certified Compositions of INCO713C Atomized Powder and Cast-To-Size Test Bars

| Element | EMS 55079 | Atomized Powder | Cast-To-Size Test Bars (Heat # 8616) |
|---|---|---|---|
| Iron | 0.25 max. | 0.18 | <0.05 |
| Manganese | 0.25 max. | 0.01 | <0.05 |
| Sulfur | 0.015 max. | 0.002 | <0.05 |
| Phosphorus | 0.015 max. | | |

Sufficient HVOF coating was applied to increase the composite specimen gauge length diameter to approximately 0.250 inches. The sprayed test bars were then sintered at 2150 F for 2 hours in vacuum, HIPed at 2200 F in 15 KSI argon for 4 hours in a standard commercial HIP toll cycle, and tested for room temperature tensile and elevated-temperature stress-rupture.

The composite test specimens used for these measurements were nominally comprised of 28 percent recast INCO713C and 72 percent as-cast INCO713C. The recast INCO713C percentage varied, however, from 25.5 to 30.9 percent depending on precise machined and sprayed specimen dimensions.

Mechanical Properties:

The room temperature tensile and 1800 F stress-rupture properties of the as-cast INCO713C core material used in these measurements are summarized in Table II.

TABLE II

INCO713C Heat # 8616 Qualification Tests

1. Room Temperature Tensile

| | | | |
|---|---|---|---|
| a. | 0.2% Y.S. | 108 KSI | |
| | UTS | 126 KSI | |
| | Elongation | 6.0% | |
| b. | 0.2% Y.S. | 112.2 KSI | 111.0 KSI |
| | UTS | 126 KSI | 135.7 KSI |
| | Elongation | 6.3% | 6.7% |

2. Stress-Rupture

| | Temperature | Stress | Rupture Life | Elongation |
|---|---|---|---|---|
| a. | 1800 F. | 22 KSI | 30.0 hours | |
| | 1800 F. | 24 KSI | 14.8 hours | 14.0% |
| b. | 1800 F. | 22 KSI | 55.3 hours | 9.1% |
| | 1800 F. | 22 KSI | 58.2 hours | 10.3% |

The room-temperature tensile and 1800 F stress-rupture properties of the 28 percent recast INCO713C composite test specimens are summarized in Table III.

TABLE III

Measured Tensile and Stress-Rupture Properties of Composite Cast/Recast INCO713C Test Specimens 1. Room Temperature Tensile Properties

| Specimen | 0.2 YS | UTS | Elongation |
|---|---|---|---|
| #1 | 123.3 KSI | 150.3 KSI | 5.6% |
| #2 | 122.0 KSI | 151.5 KSI | 6.6% |
| #3 | 122.4 KSI | 148.1 KSI | 6.7% |
| Average | 122.4 KSI | 150.0 KSI | 6.3% |

TABLE III-continued

Measured Tensile and Stress-Rupture Properties of Composite Cast/Recast INCO713C Test Specimens 2. Stress-Rupture Properties

| Specimen | Rupture Life | Elongation | Reduction in Area |
|---|---|---|---|
| @ 1800 F./22 KSI (stress calculated on cast INCO713C cross-section only) | | | |
| #4 | 60.9 hrs. | 10.7% | 21.1% |
| #5 | 55.9 hrs. | 6.3% | 17.8% |
| #6 | 60.9 hrs. | 7.1% | 16.8% |
| @ 1600 F./42 KSI (stress calculated on cast INCO713C cross-section only) | | | |
| #5 | 202.5 hrs. | 6.9% | 12.2% |
| #6 | >212.5 hrs. | 4.9% | 8.6% |

The room temperature yield and ultimate tensile strengths of the 28 percent recast INCO713C composite test specimens were approximately 11 percent higher than those of as-cast INCO713C core material. The room temperature ductility of the 28 percent recast INCO713C composite test specimens was virtually identical to that of the as-cast INCO713C core material.

The as-cast INCO713C core material and the 28 percent recast INCO713C composite test specimens were tested for stress-rupture at 1800 F under "constant load" conditions to experimentally assess the effect of the recast process on the sustained, high-temperature, load-bearing capacity of as-cast INCO713C.

The approximate time to rupture as-cast INCO713C at 1800 F/22 KSI, as estimated from available "Larsen-Miller" correlations, is 48 hours. The time to rupture the as-cast INCO713C core material test bars at 1800 F/22 KSI was 30.0 hours. The average time to rupture machined as-cast INCO713C test specimens at 1800 F/22 KSI was 56.5 hours. The average as-cast INCO713C 1800 F/22 KSI stress-rupture life was 45 hours, plus or minus 15 hours.

The 28 percent recast INCO713C composite test specimens were tested at 1800 F under loads sufficient to produce 22 KSI stress based on as-cast INCO713C substrate dimensions rather than composite test specimen dimensions. Test loads ranged from 795 to 799 pounds (797 pounds average) depending on precise as-cast INCO713C machined diameters. Corresponding composite specimen stresses ranged from 15 to 16 KSI.

The average time to rupture the 28 percent INCO713C composite test specimens under such "constant load" test conditions was 60.9 hours at 1800 F.

Data Analyses:

The data summarized in Table III show that the recast process augments the room temperature tensile properties of as-cast INCO713C.

Assuming the room temperature tensile properties of the as-cast INCO713C substrate remain unchanged by the thermal treatments associated with the recast process, "rule of mixture" analyses of the room temperature 28 percent recast INCO713C composite tensile data summarized in Table III indicate that the recast INCO713C portion of the composite has the following room temperature tensile properties:

| | |
|---|---|
| 150 KSI | 0.2% yield strength |
| 190 KSI | ultimate tensile strength |
| 5.8% | elongation |

The data summarized in Table III similarly show that the recast process augments the sustained high-temperature, load-bearing capacity of as-cast INCO713C.

"Load partitioning analysis", for lack of a better description, were used to distinguish the stress-rupture strength properties of the recast INCO713C coating from those of the as-cast INCO713C substrate.

"Larsen-Miller" stress-rupture data correlation's suggest that the stress required to increase the 1800 F rupture life of an as-cast INCO713C substrate specimen to 60.9 hours is only 21 KSI. The load required to develop a stress of 21 KSI, based on an average 0.2145 inch as-cast INCO713C substrate diameter, is 759 pounds. Since 797 pounds were applied to the 28 percent recast INCO713C composite specimens tested at 1800 F/16 KSI, it follows that the balance of the load (39 pounds) was accommodated by the recast INCO713C coating.

Since the cross-sectional area of the recast INCO713C coating in the 28 percent recast INCO713C composite specimens was 0.0161 square inches, the recast INCO713C coating stress was 2.4 KSI. The 1800 F/60.9 hour stress-rupture strength of recast INCO713C is, therefore, approximately 2.4 KSI.

Two 28 percent recast INCO713C composite test specimens were similarly tested in stress-rupture at 1600 F under loads calculated to develop a stress of 42 KSI based on as-cast INCO713C substrate dimensions.

One of the 28 percent recast INCO713C composite test specimens ruptured in 202.5 hours at 1600 F/42 KSI (based on as-cast substrate dimensions) while the other was arbitrarily terminated without rupture after 212.5 hours. An as-cast INCO713C test specimen might be expected to rupture in approximately 100 hours at 1600 F/42 KSI.

"Load-partitioning analyses" of these 1600 F stress-rupture test results suggest that the 1600 F/200 hour stress-rupture strength of the recast INCO713C coating is greater than 8 KSI.

The stress-rupture properties of the recast INCO713C coating, as inferred from "load partitioning analyses", generally correspond to those of wrought nickel or cobalt-base levels through post HIP heat treatments.

The experimental data discussed above indicate that recast INCO713C coating:

1. have intrinsically higher room temperature tensile strength than as-cast INCO713C; and, 2. have intrinsic stress-rupture strengths approximately equivalent to wrought nickel or cobalt-base alloys.

More importantly, the experimental data presented and discussed in this study convincingly demonstrate that the recast process augments the room-temperature tensile and sustained high-temperature, load-bearing capacities of as-cast INCO713C.

Figure 1B:
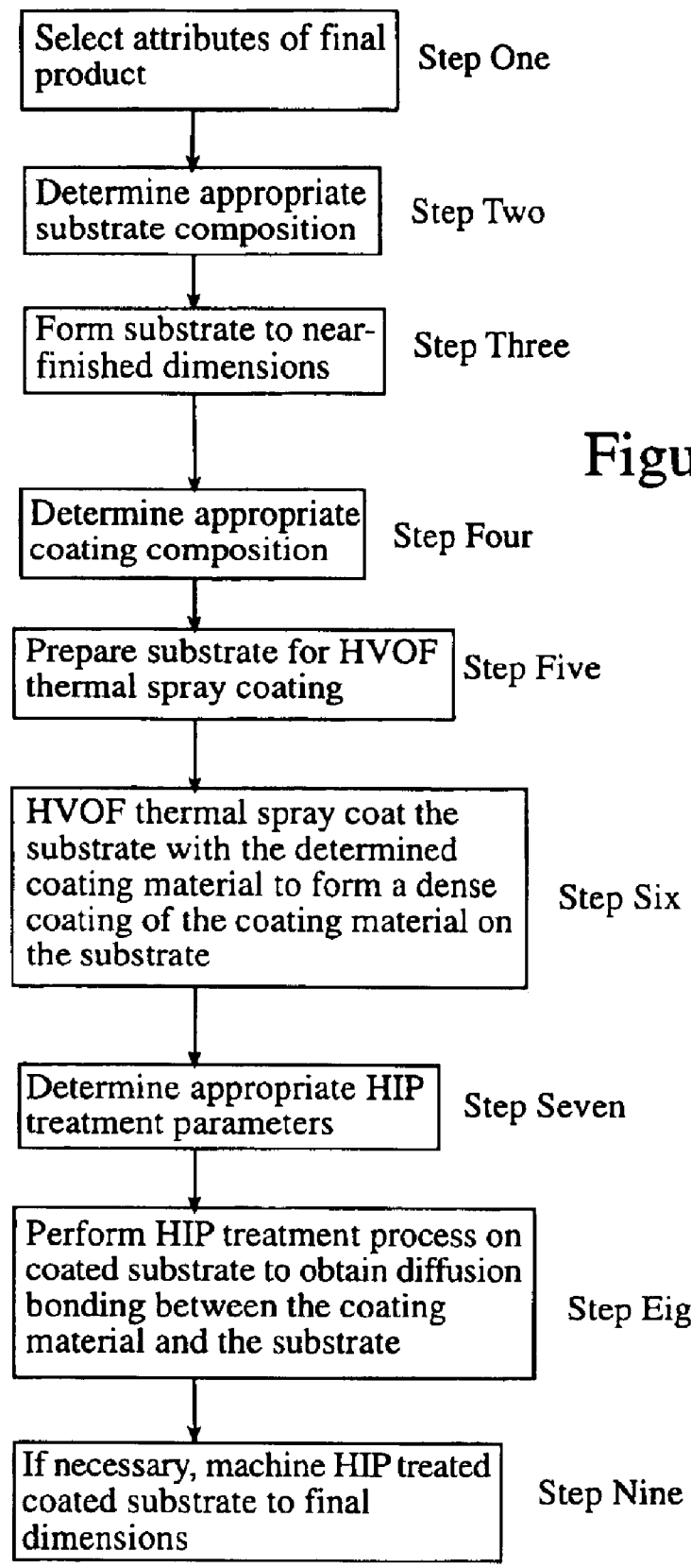

In accordance with another aspect of the present invention, a method of forming metal products and components having a durable wear resistant coating is provided. FIG. 1(b) is a flow chart showing the steps of the inventive method of forming metal products and metal components having a wear resistant coating. This method obtains a metal product having robust diffusion bonding occurring between a metal substrate and an applied coating. The first step of the inventive method is to determine the attributes of a final workpiece product (Step One). For example, if the final workpiece product is a cutting tool the attributes include a wear resistant surface formed on a relatively inexpensive tool substrate 10. If the final workpiece is a cast metal component, a decorative, smooth final surface may be desired on a cast substrate 16.

An appropriate substrate composition is then determined (Step Two) depending on the selected attributes. In the example of a cutting tool, the substrate composition may be high speed steel, which is relatively inexpensive to form but durable enough for its intended purpose. In the case of a cast metal component, the cast workpiece substrate can be formed from cast iron or aluminum (or other cast metal or metal alloy). A workpiece substrate is formed to near-finished dimensions (Step Three), using known processes such as casting, extruding, molding, machining, etc. An appropriate coating material 12 composition is determined depending on the selected attributes (Step Four). Again, in the example of a cutting tool the coating material 12 could be selected from a number of relatively hard and durable metals and alloys such as Cobalt, Carbide, TiN, etc. In the example of the cast metal component, aluminum oxide may be chosen to provide both a decorative and corrosion resistant surface. The selection of both the substrate and coating composition also depends on their metallurgical compatibility with each other.

The workpiece substrate is prepared for a high-density coating process (Step Five). The preparation may include cleaning, blasting, machining, masking or other like operations. Once the workpiece substrate has been prepared, a high-density coating process is performed to coat the workpiece substrate (Step Six). The coating material 12 is built-up to a thickness that is effective to obtain desired finished dimensions after performing a hot isostatic pressing treatment (described below). The high-density coating process may comprise performing a hyper velocity oxy-fuel thermal spray process. In the case of HVOF, a fuel gas and oxygen are used to create a combustion flame at 2500 to 3100° C. The combustion takes place at a very high chamber pressure and a supersonic gas stream forces the coating material 12 through a small-diameter barrel at very high particle velocities. The HVOF process results in extremely dense, well-bonded coatings. Typically, HVOF coatings can be formed nearly 100% dense, with at a porosity of about 0.5%.

The high particle velocities obtained using the HVOF process results in relatively better bonding between the coating material 12 and the substrate, as compared with other coating methods such as the Conventional Plasma spray method or the Chemical Vapor Deposition method. However, the HVOF process also forms a bond between the coating material 12 and the substrate that occurs primarily through mechanical adhesion at a bonding interface. As will be described below, in accordance with the present invention this mechanical bond is converted to a metallurgical bond by creating a diffusion bond between the coating material 12 and the workpiece substrate. The diffusion bond does not have the interface boundary which is usually the site of failure.

The diffusion bond is created by subjecting the coated workpiece substrate to a hot isostatic pressing (HIP) treatment. The appropriate hot isostatic pressing treatment parameters are selected depending on the coating, the workpiece substrate and the final attributes that are desired (Step Seven). The hot isostatic pressing treatment is performed on the coated workpiece substrate to obtain a metal product having the desired finished dimensions and diffusion bonding between the coating material 12 and the workpiece substrate (Step Eight).

By proper formation of the workpiece substrate, the final dimensions of the finished workpiece product can be accurately achieved through the precise control of the build up of coating material 12 when the HVOF plasma spray process is performed.

Alternatively, the HIP treated and HVOF coated workpiece substrate may be machined to final dimensions as necessary (Step Nine).

HIP treatment is conventionally used in the densification of cast metal components and as a diffusion bonding technique for consolidating powder metals. In the HIP treatment process, a part to be treated is raised to a high temperature and isostatic pressure. Typically, the part is heated to 0.6–0.8 times the melting point of the material comprising the part, and subjected to pressures on the order of 0.2 to 0.5 times the yield strength of the material. Pressurization is achieved by pumping an-inert gas, such as Argon, into a pressure vessel 14. Within the pressure vessel 14 is a high temperature furnace, which heats the gas to the desired temperature. The temperature and pressure is held for a set length of time, and then the gas is cooled and vented.

The HIP treatment process is used to produce near-net shaped components, reducing or eliminating the need for subsequent machining operations. Further, by precise control of the temperature, pressure and time of a HIP treatment schedule a particular microstructure for the treated part can be obtained.

In accordance with the present invention, the HIP treatment process is performed on a HVOF coated substrate to convert the adhesion bond, which is merely a relatively weaker mechanical bond, to a diffusion bond, which is a relatively stronger metallurgical bond. In accordance with the present invention, an HVOF coating process is used to apply the coating material 12 having sufficient density to effectively undergo the densification changes that occur during the HIP process. A sintering heat treatment step may be performed improve the density of the coating material and prevent gas entrapment during the hot isostatic pressing treatment. If the coating material 12 and the workpiece substrate are comprised of the same metal composition, then the diffusion bonding results in a particularly seamless transition between the substrate and the coating.

As shown in FIGS. 2(*a*) through 2(*d*), the inventive method can be used for forming a metal product having a wear resistant surface. FIG. 2(*a*) is a schematic view showing a tool substrate 10 provided in accordance with the inventive method of forming metal components having a wear resistant coating. The inventive method can be employed to produce, for example, a long lasting cutting tool from a relatively inexpensive cutting tool substrate 10.

In accordance with this aspect of the invention, a workpiece substrate is formed to near-finished dimensions. The tool substrate 10 may be a drill bit, end mill, lathe tool bit, saw blade, planer knifes, cutting tool inserts, or other cutting tool part. The substrate may, alternatively, be something other than a tool. For example, ice skate blades and snow ski edges may be treated in accordance with the present invention to obtain a long wearing edge. Kitchen knives may be treated in accordance with the present invention to reduce or even eliminate the need for constant sharpening. Further, products such as pen tips and fishing hooks may be treated in accordance with the present invention so as to benefit from long lasting durability. Nearly any metal component that could benefit from a longer wearing, dense surface structure might be a candidate from the present invention. For example, steam turbine erosion shields, fly ash fan blades, power plant conveyors, are all subjected to wear and/or surface erosion forces. The present invention can be used to provide the protective surface characteristics, as described herein, that enhance the effectiveness of products such as these.

FIG. 2(*b*) is a schematic view of the tool substrate 10 having a wear resistant coating applied using an HVOF thermal spray process in accordance with the inventive method. A high-density coating process, such as a hyper velocity oxy-fuel thermal spray process, is performed to coat the workpiece substrate 10 with a wear resistant coating material 12 using, for example, an HVOF nozzle. The coating material 12 is built-up to a thickness that is effective to obtain desired finished dimensions after performing a hot isostatic pressing treatment.

FIG. 2(*c*) is a schematic view of the HVOF spray coated tool substrate 10 undergoing a HIP treatment process in a HIP vessel 14. The hot isostatic pressing treatment is performed on the coated workpiece substrate to obtain a metal product having the desired finished dimensions and diffusion bonding between the coating material 12 and the workpiece substrate.

FIG. 2(*d*) is a schematic view of the final HVOF spray coated and HIP treated tool having a wear resistant coating layer diffusion bonded to the tool substrate 10. In accordance with the present invention the mechanical bond formed between the parent substrate and the applied coating is converted to a metallurgical bond by creating a diffusion bond between the coating material 12 and the parent substrate. The diffusion bond does not have the interface boundary which is usually the site of failure, thus a superior product is obtained that has desired surface properties, such as wear resistance, color, smoothness, texture, etc. These surface properties do not end abruptly at a bonding interface (as is the case of conventional coated or brazed products), but rather remain present to a continuously varying degree from the product surface to the parent metal. A cutting edge can be put on the tool surface by conventional sharpening techniques taking care not to remove more of the diffusion bonded coating than is necessary.

FIGS. 3(*a*) through 3(*e*) illustrate the present inventive method employed for forming a cast metal product having predetermined dimensions and surface characteristics. FIG. 3(*a*) is a schematic perspective view of a cast metal workpiece substrate undergoing a machining operation. As shown in FIG. 3(*a*), the cast metal workpiece is machined, if necessary, to near-finished dimensions. FIG. 3(*b*) is a schematic perspective view of the machined cast metal component.

A high-density coating process, such as a hyper velocity oxy-fuel thermal spray process, is performed to coat the workpiece substrate with a coating material 12. FIG. 3(*c*) is a schematic perspective view of the machined cast metal component having a coating applied using an HVOF thermal spray process. The coating material 12 is built-up to a thickness effective to obtain desired finished dimensions after performing a hot isostatic pressing treatment. FIG. 3(*d*) is a schematic perspective view of the HVOF spray coated machined cast metal component undergoing a HIP treatment process in a HIP vessel 14. The hot isostatic pressing treatment is performed on the coated workpiece substrate to obtain a metal product having the desired finished dimensions and diffusion bonding between the coating material 12 and the workpiece substrate. FIG. 3(e) is a schematic perspective view of the final HVOF spray coated and HIP treated machined cast metal product having a coating layer diffusion bonded to the machined cast metal component.

FIG. 4 is a flow chart showing the steps of the inventive method of repairing a turbine engine part. The present inventive method can be used for repairing a turbine engine part 18, such as a blade or vane. In accordance with this aspect of the invention a turbine engine part 18, which is comprised of a metal or metal alloy, is first cleaned (Step One). If necessary, eroded portions of the turbine engine part 18 are welded using a weld material comprised of the same metal or metal alloy as the parent or original metal engine part (Step Two). The welding operation is performed to build up heavily damaged or eroded portions of the turbine engine part 18. If the part is not heavily damaged, the welding operation may be obviated.

The welding operation will typically produce weld witness lines. The weld witness lines are ground flush to prevent blast material from becoming entrapped in the weld witness lines (Step Three). Portions of the engine part that are not to be HVOF sprayed are masked (Step Four), and the engine part is again cleaned in preparation for HVOF spraying (Step Five). HVOF plasma spraying of the unmasked portions of the engine part is performed (Step Six). The HVOF plasma spray material (coating material 12) is comprised of the same metal alloy as the parent or original metal engine part. The HVOF plasma spray material is applied so as to build up a cordal dimension of the engine part to a thickness greater than the thickness of an original cordal dimension of the engine part. A sintering heat treatment process may be performed to further densify the coating material. A hot isostatic pressing (HIP) treatment if performed on the coated engine part to densify the coating material 12, to create a diffusion bond between the coating material 12 and the parent and weld material, and to eliminate voids between the turbine engine part 18, the weld material and the coated material (Step Seven). Finally, the engine part is machined, ground and/or polished to the original cordal dimension (Step Eight).

FIG. 5(a) is a schematic side view and FIG. 5(b) is a schematic cross-sectional view of a worn turbine engine part 18 before undergoing the inventive method of repairing a turbine engine part 18. Metal alloy components, such as gas turbine parts such as blades and vanes, are often damaged during use. During operation, gas turbine parts are subjected to considerable degradation from high pressure and, in the case of rotating components such as blades, centrifugal force in a hot corrosive atmosphere. The gas turbine parts also sustain considerable damage due to impacts from foreign particles. Further, during inspection and/or repair operations the engine parts are stripped of a protective diffusion coating, which usually results in the reduction of some of the substrate thickness. This degradation results in a limited service life for these parts. Since they are costly to produce, various conventional repair methods are employed to refurbish damaged gas turbine blades and vanes. However, these conventional repair methods generally require labor intensive machining and welding operations that often subject the part to damaging stress. Also, these conventional repair methods typically utilize low pressure plasma spray for the application of a coating material 12. Conventional plasma spray coating methods deposit the coating material 12 at relatively low velocity, resulting in voids being formed within the coating and in a coating density typically having a porosity of about 5.0%. Again, the bond between the substrate and the coating occurs primarily through mechanical adhesion at a bonding interface, and if the coating is subjected to sufficient shearing forces it will flake off of the workpiece substrate. Further, the high porosity of the coating obtained through conventional plasma spray coating make them inadequate candidates for diffusion bonding through the HIP treating process described herein.

FIG. 6(a) is a schematic side view and FIG. 6(b) is a schematic cross-sectional view of the worn turbine engine part 18 showing the worn areas 20 to be repaired using the inventive method of repairing a turbine engine part 18. The area enclosed by the dashed lines represent the material that has been erode or otherwise lost from the original turbine engine part 18. In accordance with the present invention, this area is reconstituted using the same material as the original blade and using the inventive metal treatment process. The worn turbine engine part 18 (in this case, a turbine blade) is first cleaned to prepare the worn surfaces for welding (see Step One, FIG. 4).

FIG. 7(a) is a schematic side view and FIG. 7(b) is a schematic cross-sectional view of the worn turbine engine part 18 showing the worn areas filled in with similar weld material 22 in accordance with the inventive method of repairing a turbine engine part 18 (see Step Two, FIG. 4). In accordance with the present invention, the weld material is the same as the original blade material making the bond between the weld and the substrate exceptionally strong.

FIG. 8(a) is a schematic side view and FIG. 8(b) is a schematic cross-sectional view of the welded turbine engine part 25 showing areas 24 to be built up with similar coating material 12 using an HVOF spray coating process in accordance with the inventive method of repairing a turbine engine part. In accordance with the present invention, the coating material 12 is the same as the original blade material, again making the bond between the weld and the substrate exceptionally strong.

FIG. 9(a) is a schematic side view and FIG. 9(b) is a schematic cross-sectional view of the HVOF built up, welded turbine engine part 27 showing an area, such as the vane or blade root, masked 26 before performing the HVOF spray coating process in accordance with the inventive method of repairing a turbine engine part. The coating material 12 is built-up to a thickness that is effective to obtain desired finished dimensions after performing a hot isostatic pressing treatment (described below).

The high-density coating process may comprise performing a hyper velocity oxy-fuel thermal spray process. In the case of HVOF, a fuel gas and oxygen are used to create a combustion flame at 2500 to 3100° C. The combustion takes place at a very high chamber pressure and a supersonic gas stream forces the coating material 12 through a small-diameter barrel at very high particle velocities. The HVOF process results in extremely dense, well-bonded coatings. Typically, HVOF coatings can be formed nearly 100% dense, with at a porosity of about 0.5%. The high particle velocities obtained using the HVOF process results in relatively better bonding between the coating material 12 and the substrate, as compared with other coating methods such as the conventional plasma spray method or the chemical vapor deposition method. However, the HVOF process forms the bond between the coating material 12 and the substrate that occurs primarily through mechanical adhesion at a bonding interface. As will be described below, in accordance with the present invention this mechanical bond is converted to a metallurgical bond by creating a diffusion bond between the coating material 12 and the workpiece substrate. The diffusion bond does not have the interface boundary which is usually the site of failure.

The diffusion bond is created by subjecting the coated workpiece substrate to a hot isostatic pressing (HIP) treatment. The appropriate hot isostatic pressing treatment parameters are selected depending on the coating, the workpiece substrate and the final attributes that are desired. The hot isostatic pressing treatment is performed on the coated workpiece substrate to obtain a metal product having the desired finished dimensions and diffusion bonding between the coating material 12 and the workpiece substrate.

FIG. 10 is a schematic view of the HVOF built up, welded turbine engine part 27 undergoing a HIP treatment process in a HIP vessel 14 in accordance with the inventive method of repairing a turbine engine part.

HIP treatment is conventionally used in the densification of cast metal components and as a diffusion bonding technique for consolidating powder metals. In the HIP treatment process, a part to be treated is raised to a high temperature and isostatic pressure. Typically, the part is heated to 0.6–0.8 times the melting point of the material comprising the part, and subjected to pressures on the order of 0.2 to 0.5 times the yield strength of the material. Pressurization is achieved by pumping an inert gas, such as Argon, into a pressure vessel 14. Within the pressure vessel 14 is a high temperature furnace, which heats the gas to the desired temperature. The temperature and pressure is held for a set length of time, and then the gas is cooled and vented.

The HIP treatment process is used to produce near-net shaped components, reducing or eliminating the need for subsequent machining operations. Further, by precise control of the temperature, pressure and time of a HIP treatment schedule a particular microstructure for the treated part can be obtained.

FIG. 11(a) is a schematic side view and FIG. 11(b) is a schematic cross-sectional view of the final HVOF spray coated and HIP repaired turbine engine part 28 having a similar metal coating layer diffusion bonded to the original parent substrate and welded portions in accordance with the inventive method of repairing a turbine engine part. By proper formation of the workpiece substrate, the final dimensions of the finished workpiece produce can be accurately achieved through the precise control of the build up of coating material 12 when the HVOF plasma spray process is performed. Alternatively, the HIP treated and HVOF coated workpiece substrate may be machined to final dimensions as necessary (Step Eight).

An experimental test piece was prepared in accordance with the inventive method of treating metal components. Photomicrographs of the test piece showed the grain structure and diffusion bonding of the coating material 12 and the substrate after the inventive method has been performed. The HIP treatment process was performed on an HVOF coated test substrate to convert the adhesion bond between the coating and the substrate, which is merely a mechanical bond, to a diffusion bond, which is a metallurgical bond. In accordance with the present invention, an HVOF coating process is used to apply the coating material 12 having sufficient density to effectively undergo the densification changes that occur during the HIP process. In the case of the test piece example, the coating material 12 and the workpiece substrate are comprised of the same metal composition. The diffusion bonding results in a transition between the substrate and the coating that has a much stronger structural integrity and wear characteristics as compared with the conventional art.

The test piece was prepared by building up coating material 12 to a thickness of approximately 0.02 inches, and the composition of the test pieces was determined at seven locations (A–G) across a cross section of the piece. The composition was found to be substantially uniform across the cross-section of the test piece, as shown in the following table.

TABLE I

| Element | Elemental Composition (Weight %) | | | | | | |
|---|---|---|---|---|---|---|---|
| | A | B | C | D | E | F | G |
| Aluminum | 5.4 | 5.2 | 5.5 | 6.2 | 6.3 | 6.4 | 6.5 |
| Titanium | 0.6 | 0.6 | 1.0 | 0.6 | 1.0 | 0.6 | 0.9 |
| Chromium | 12.9 | 13.2 | 14.5 | 12.7 | 11.5 | 13.7 | 14.1 |
| Nickel | REM | REM | REM | REM | REM | REM | REM |
| Niobium | 1.4 | 1.5 | 1.8 | 2.1 | 1.7 | 2.3 | 2.6 |
| Molybdenum | 3.7 | 4.1 | 3.6 | 3.3 | 3.4 | 3.9 | 3.0 |

A photomicrograph of the treated workpiece shows the grain structure and diffusion bonding of the coating material 12 and the substrate after the inventive method has been performed. In accordance with the present invention, the HIP treatment process is performed on a HVOF built up, welded turbine engine part to convert the adhesion bond, which is merely a mechanical bond, to a diffusion bond, which is a metallurgical bond. In accordance with the present invention, an HVOF coating process is used to apply the coating material 12 having sufficient density to effectively undergo the densification changes that occur during the HIP process. If the coating material 12 and the workpiece substrate are comprised of the same metal composition, then the diffusion bonding results in smooth transition between the substrate and the coating. In contrast, a conventional plasma spray coating method results in a relatively weak bond between the coating and the substrate. The bond is primarily due to a mechanical adhesion bond that occurs relatively locally within a boundary interface.

As discussed in detail above, in accordance with the present inventive method a deformed gas turbine engine airfoil part can be returned to the dimensions required to place the part back into useful service. A diffusion bond is created between the coating material and the substrate of a repaired gas turbine engine airfoil part. This diffusion bond is extremely robust and results in a repaired engine part that has the appropriate mechanical properties that allow the part to be safely returned to service. The inventive method of repairing a turbine engine airfoil part offers substantial savings because it provides for the efficient and effective repairing of expensive engine parts which otherwise might have been discarded.

As shown in FIG. 13 in accordance with another aspect of the present invention, the reclassification of a gas turbine engine airfoil part is obtained. The dimensional differences between pre-reclassified dimensions of the buttresses of a turbine engine airfoil part and desired post-reclassified dimensions of the buttresses are determined (Step One). That is, the change in shape of the inner buttress and outer buttress necessary to obtained a desired angular relationship between the airfoil section and the buttresses is determined. Build-up thickness of coating material required to obtain the desired post-reclassified dimensions of the buttresses is determined (Step Two). A high-density coating process, such as HVOF, is used to coat the buttresses of the turbine engine airfoil part with a coating material (Step Three). The portions of the part that are not to be built up, such as the airfoil section and parts of the buttresses, may be masked before applying the high-density coating. Also, some of the coated surfaces of the part may need to be built up more than others. The coating material is applied at least to the determined build-up thickness of coating material effective to obtain the desired post-reclassification dimensions after performing a hot isostatic pressing treatment, and after the selective removal of some of the original buttress material and some of the built up coating material.

As discussed herein, the coating material comprises a metal alloy capable of forming a diffusion bond with the substrate of the turbine engine airfoil part. After the coating material is applied, the sintering heat treatment process may be performed (Step Four) to prevent gas entrapment of the coating material and/or the diffusion bonding area during the hot isostatic pressing process. Then, the hot isostatic pressing process is performed so that the buttresses of the turbine engine airfoil part have a robust diffusion bonding between the coating material and the original material of the buttresses (Step Five). Having built up the appropriate dimensions of the inner buttress and outer buttress, the reclassification of the part is obtained by selectively removing the original buttress material and, if necessary, some of the built up material until the angular relationship between the airfoil section and the inner and outer buttresses is obtained (Step Six). The material can be removed through milling, grinding, or other suitable and well known machining operations. Further, to facilitate obtaining the correct dimensions the centerline position of the airfoil part can be located and held by mounting the part in a suitable holding fixture when machining the buttresses.

The fixture may be so constructed so that a vane that has at least a minimum amount of material built up on its buttresses can be machined and reclassified. In this case, it may not be necessary to determine the dimensional differences or the required build-up thickness. Rather, the inventive high density coating and HIPing process (and, if needed sintering) can be performed to build up at least the minimum amount of material diffusion bonded to the buttresses. Then, the vane is placed in the fixture and the excess material (both original buttress material and the built-up material) is machined until the buttresses have been reshaped and the vane reclassified as intended or restored to original.

The class of a turbine engine vane is defined by the angular relationship between the airfoil section and the inner and outer buttresses. The inventive recast process is utilized to change or restore the original class of a turbine engine airfoil part by building up sufficient material on the inner buttress and the outer buttress so that the buttresses can then be machined to create the desired angles α and α' (shown in FIGS. 14(b) and 14(c)) and reclassify the vane.

All buttresses are dimensionally the same and all airfoils are dimensionally the same for all classes of vanes. In accordance with the present invention, the airfoil centerline position is held by mounting the vane in a fixture, and the buttresses are machined to obtained to desired reclassification parameters.

The class of a turbine engine vane 20 is defined by the angular relationship between the airfoil section 22 and the inner buttress 24 and outer buttress 26. The inventive recast process is utilized to change or restore the original class of a turbine engine airfoil part by building up sufficient material on the inner buttress 24 and the outer buttress 26 so that the buttresses 24, 26 can then be machined to create the desired angles α and α' (shown in FIGS. 14(b) and 14(c)) and reclassify the vane 20.

All buttresses 24, 26 are dimensionally the same and all airfoils are dimensionally the same for all classes of vanes. In accordance with the present invention, the airfoil centerline position is held by mounting the vane 20 in a fixture, and the buttresses 24, 26 are machined to obtained to desired reclassification parameters.

FIG. 14(a) is a front view of a vane 20 from a gas turbine engine showing the airfoil section 22, the outer buttress 26 and the inner buttress 24. In accordance with this aspect of the invention, it is first determined what dimensions of the inner buttress 24 and outer buttress 26 need to be adjusted in order to obtain the desired reclassification of the vane 20. Having determined the dimensional differences between the pre-reclassified buttresses 24, 26 and the post-reclassified buttresses 24, 26, it is next determine how much material must be added, and where the material must be added so that the buttresses 24, 26 can be reshaped.

FIG. 14(b) is a partial top view showing the outer buttress 26 and angle α indicating the angular relationship between the airfoil section 22 and the outer buttress 26 and FIG. 14(c) is a partial bottom view showing the inner buttress 24 and angle α' indicating the angular relationship between the airfoil section 22 and the inner buttress 24. In accordance with the present invention, the vane 20 is reclassified by changing the shape of the buttresses 24, 26 so that the angles α and α' are changed resulting in a changed angle of attack of the airfoil section 22, and thus reclassification of the vane 20.

FIG. 14(d) is a partial left-side view showing the leading edge foot 28 of the inner buttress 24 and the outer foot front face 30 of a buttress rail 32 of the outer buttress 26 and FIG. 14(e) is a partial right-side view showing the trailing edge foot 34 of the inner buttress 24 and the other buttress rail 32 of the outer buttress 26. In accordance with the present invention, the surfaces of the buttresses 24, 26, such as the leading edge foot 28, center log 36, trailing edge foot 34 (inner buttress 24), and the outer foot front face 30 and buttress rails 32 (outer buttress 26) are selectively built up and machined so that the angle of attack of the airfoil section 22 is adjusted. The build up of material on the buttresses 24, 26 may be uniform, and then the buttresses 24, 26 machined to selectively remove portions of the original substrate and portions of the build up material. To reduce machine costs, the surfaces of the original buttresses 24, 26 that are going to be machined may be masked before the buildup material is applied. In this case, the buildup material will not have to be later machined along with the original substrate to reshape the buttresses 24, 26 24, 26.

A fixture for holding the vane 20 during the machining operation(s) may be so constructed so that the vane 20 having at least a minimum amount of material built up on its buttresses 24, 26 can be machined and reclassified. In this case, it may not be necessary to determine the dimensional differences or the required build-up thickness. Rather, the inventive high density coating and HIPing process (and, if needed sintering and other processes described herein) can be performed to build up at least the minimum amount of material diffusion bonded to the buttresses 24, 26 24, 26. Then, the vane 20 is placed in the fixture and the excess material (both original buttress material and the built-up material) is machined until the buttresses 24, 26 have been reshaped and the vane reclassified as intended.

The resulting reclassified vane has inner and outer buttresses with the mechanical properties required for safe return to active service in an operating gas turbine engine. The diffusion bonding between the applied coating material built up on the buttresses and the original buttress substrate ensures, as substantiated by the test results discussed herein, that the reclassified vane can be safely returned to active service.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed is:

1. A method of forming a metal product having an edge area comprising a cutting edge having a wear resistant surface, comprising the steps of: forming a workpiece substrate having an edge area comprising a cutting edge portion; performing a high-density coating process to coat at least the cutting edge portion of the workpiece substrate with a wear resistant coating material; performing a hot isostatic pressing treatment on the coated workpiece substrate to obtain a metal product having a wear resistant surface comprised of the coating material, the hot isostatic pressing treatment comprising disposing the coated workpiece substrate within a chamber, filling the chamber with an inert gas, and heating and pressurizing the inert gas so that the wear resistant surface is formed at the cutting edge portion and having a diffusion bonding between the coating material and the workpiece substrate; and sharpening the cutting edge portion so that the diffusion bonding between the coating material and the workpiece substrate retains the wear resistant coating material on the cutting edge portion during the sharpening process of the cutting edge portion and during use of the cutting edge portion of the formed metal product.

2. A method of forming a metal product having a cutting edge according to claim 1 wherein the step of performing the high-density coating process comprises performing a hyper velocity oxy-fuel thermal spray process.

3. A method of forming a metal product having a cutting edge according to claim 2 wherein the step of hot isostatic pressing treating comprises the step of heating the coated cutting tool substrate to a temperature that is substantially 80% of the melting point of the coating material; and pressurizing the coated cutting tool substrate to a pressure substantially between 20 and 50 percent of the yield strength of the [metal alloy] coating material in an inert gas atmosphere.

4. A method of forming a metal product having a cutting edge according to claim 3 further comprising the step of performing a sintering heat treatment on the coated workpiece substrate to remove entrapped gas in the coating material before performing the hot isostatic pressing treatment so that the formed metal product has a relatively smooth surface texture.

5. A method of forming a metal product having a cutting edge according to claim 1 wherein the workpiece substrate comprises a high speed steel substrate composition.

6. A method of forming a metal product having a cutting edge according to claim 1 wherein the coating material comprises a hard and durable metal such as Cobalt, Carbide and TiN.

7. A method of forming a metal product having a cutting edge according to claim 1 wherein the workpeice substrate comprises a nickel or cobalt-base superalloy; and the step of performing the high-density coating process comprises performing a high-density coating process such as a hyper velocity oxy-fuel thermal spray process or a detonation gun process to apply the coating material as a high-density coating.

8. A method of forming a metal product having a cutting edge according to claim 1 wherein the cutting tool comprises one of a drill bit, end mill, lathe tool bit, saw blade, planer knife, and cutting tool insert.

9. A method of forming a metal product having a cutting edge according to claim 1 wherein the metal product formed comprises one of an ice skate blade, snow ski edge, pen tip and fishing hook.

10. A method of forming a kitchen knife having an edge area comprising a cutting edge having a wear resistant surface, comprising the steps of: forming a knife substrate having an edge area comprising a cutting edge portion; performing a high-density coating process to coat at least the cutting edge portion of the knife substrate with a wear resistant coating material; performing a hot isostatic pressing treatment on the coated knife substrate to obtain a kitchen knife having a wear resistant surface comprised of the coating material, the hot isostatic pressing treatment comprising disposing the coated workpiece substrate within a chamber, filling the chamber with an inert gas, and heating and pressurizing the inert gas so that the wear resistant surface is formed at the cutting edge portion and having a diffusion bonding between the coating material and the knife substrate; and sharpening the cutting edge portion so that the diffusion bonding between the coating material and the knife substrate retains the wear resistant coating material on the cutting edge portion during an edge sharpening process of the cutting edge portion and during use of the cutting edge portion of the formed kitchen knife.

11. A method of forming a kitchen knife having a cutting edge according to claim 10 wherein the step of performing the high-density coating process comprises performing a hyper velocity oxy-fuel thermal spray process.

12. A method of forming a kitchen knife having a cutting edge according to claim 11 wherein the step of hot isostatic pressing treating comprises the step of heating the coated cutting tool substrate to a temperature that is substantially 80% of the melting point of the coating material; and pressurizing the coated cutting tool substrate to a pressure substantially between 20 and 50 percent of the yield strength of the coating material in an inert gas atmosphere.

13. A method of forming a kitchen knife having a cutting edge according to claim 12 further comprising the step of performing a sintering heat treatment on the coated knife substrate to remove entrapped gas in the coating material before performing the hot isostatic pressing treatment so that the formed kitchen knife has a relatively smooth surface texture.

14. A method of forming a kitchen knife having a cutting edge according to claim 10 wherein the coating material comprises a hard and durable metal such as Cobalt, Carbide and TiN.

15. A method of forming a cutting tool having a cutting edge having a wear resistant surface, comprising the steps of: forming a cutting tool substrate having a cutting edge portion; performing a high-density coating process to coat at least the cutting edge portion of the cutting tool substrate with a wear resistant coating material; and performing a hot isostatic pressing treatment on the coated cutting tool substrate to obtain a cutting tool having a wear resistant surface comprised of the coating material, the hot isostatic pressing treatment comprising disposing the coated workpiece substrate within a chamber, filling the chamber with an inert gas, and heating and pressurizing the inert gas so that the wear resistant surface is formed at the cutting edge portion and having a diffusion bonding between the coating material and the cutting tool substrate, the diffusion bonding between the coating material and the cutting tool substrate being effective for retaining the wear resistant coating material on the cutting edge portion during an edge sharpening process of the cutting edge portion and during use of the cutting edge portion of the formed cutting tool.

16. A method of forming a cutting tool having a cutting edge according to claim 15 wherein the step of performing the high-density coating process comprises performing a hyper velocity oxy-fuel thermal spray process.

17. A method of forming a cutting tool having a cutting edge according to claim 16 wherein the step of hot isostatic pressing treating comprises the step of heating the coated cutting tool substrate to a temperature that is substantially 80% of the melting point of the coating material; and pressurizing the coated cutting tool substrate to a pressure substantially between 20 and 50 percent of the yield strength of the coating material in an inert gas atmosphere.

18. A method of forming a cutting tool having a cutting edge according to claim 17 further comprising the step of performing a sintering heat treatment on the coated cutting tool substrate to remove entrapped gas in the coating material before performing the hot isostatic pressing treatment so that the formed cutting tool has a relatively smooth surface texture.

19. A method of forming a cutting tool having a cutting edge according to claim 15 wherein the coating material comprises a hard and durable metal such as Cobalt, Carbide and TiN.

* * * * *